(12) United States Patent
Kanan et al.

(10) Patent No.: US 11,876,399 B1
(45) Date of Patent: Jan. 16, 2024

(54) SYSTEMS AND METHODS FOR OFFSETTING NO LOAD ENERGY LOSSES OF A BATTERY ENERGY STORAGE SYSTEM

(71) Applicant: 8ME NOVA, LLC, El Dorado Hills, CA (US)

(72) Inventors: Nadim Kanan, Elk Grove, CA (US); Lukas Hansen, El Dorado Hills, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/472,770

(22) Filed: Sep. 22, 2023

Related U.S. Application Data

(63) Continuation of application No. 18/326,203, filed on May 31, 2023, now Pat. No. 11,811,258.

(60) Provisional application No. 63/463,258, filed on May 1, 2023.

(51) Int. Cl.
*H02J 7/00* (2006.01)
*H02J 7/34* (2006.01)
*H02J 3/32* (2006.01)

(52) U.S. Cl.
CPC ............. *H02J 7/342* (2020.01); *H02J 3/32* (2013.01); *H02J 7/0049* (2020.01); *H02J 7/00712* (2020.01); *H02J 2203/10* (2020.01); *H02J 2300/20* (2020.01)

(58) Field of Classification Search
CPC ...... H02J 7/342; H02J 7/0049; H02J 7/00712; H02J 3/32; H02J 2203/10
USPC ........................................................ 320/101
See application file for complete search history.

(56) References Cited

U.S. PATENT DOCUMENTS

| | | | |
|---|---|---|---|
| 7,469,541 B1 | 12/2008 | Melton et al. | |
| 10,326,305 B1* | 6/2019 | Jelinek | H02J 3/32 |
| 2009/0076661 A1 | 3/2009 | Pearson et al. | |
| 2011/0140649 A1 | 6/2011 | Choi | |
| 2011/0215640 A1 | 9/2011 | Donnelly et al. | |
| 2013/0057196 A1 | 3/2013 | Ku et al. | |
| 2018/0248379 A1* | 8/2018 | Schulz | H02J 11/00 |
| 2018/0356782 A1 | 12/2018 | Elbsat et al. | |
| 2020/0387981 A1 | 12/2020 | Tinio et al. | |
| 2021/0268931 A1 | 9/2021 | Gupta | |
| 2022/0037900 A1 | 2/2022 | Hira | |
| 2022/0065162 A1 | 3/2022 | Hunt et al. | |

FOREIGN PATENT DOCUMENTS

JP 6448225 B2 1/2016

\* cited by examiner

*Primary Examiner* — Zixuan Zhou
(74) *Attorney, Agent, or Firm* — Foley & Lardner LLP

(57) ABSTRACT

The present disclosure provides systems and methods for offsetting parasitic energy losses of a battery energy storage system (BESS). A method may include determining, by one or more processors of a renewable energy power plant coupled to an energy grid, a condition is satisfied; and responsive to the determination, adjusting, by the one or more processors, a state of a switch from a first state configured to couple a second BESS with a renewable energy source (RES) to a second state configured to couple the second BESS with the BESS. The RES configured to charge the T-BESS when the switch is in the first state and the T-BESS configured to send energy to the devices to satisfy energy requirements of the devices when the switch is in the second state.

19 Claims, 18 Drawing Sheets

SYSTEMS AND METHODS FOR OFFSETTING NO LOAD ENERGY LOSSES OF A BATTERY ENERGY STORAGE SYSTEM

CROSS-REFERENCE TO RELATED APPLICATIONS

This application claims the benefit of priority to U.S. patent application Ser. No. 18/326,203, filed May 31, 2023, which claims the benefit of priority to U.S. Provisional Application No. 63/463,258, filed May 1, 2023, the entirety of each which is incorporated by reference herein.

BACKGROUND

Several industrial applications may implement the use of a battery energy storage system ("BESS") for the use of storing, and later providing, electrical energy. A BESS may include one or more transformers that enable the BESS to distribute large amounts of energy across transmission lines.

The BESS may be stored inside a renewable energy facility. For instance, the BESS may be configured to power or energize equipment operating within the renewable energy facility to ensure the renewable energy facility remains operational. To obtain the energy that is needed to power the equipment, the BESS may be charged over different periods of a day. The BESS may be charged by an energy grid connected to the renewable energy facility, depending on the availability of energy from the grid, the BESS may be charged by a local energy generation system without the energy passing through the grid, or both. In some cases, the BESS may provide energy to the energy grid to enable the energy grid to provide energy to other loads that require energy to operate.

SUMMARY

During operation, there may be times in which the BESS is not charging energy from or discharging energy to the energy grid. During these times, the BESS may be in a "standby state" in which the BESS inherently consumes small amounts of energy to remain ready to operate when needed. A portion of the energy that is lost may be from parasitic losses of a transformer of the BESS. Other examples of losses may include idle inverter losses and losses incurred by equipment connected to the system, even if the equipment is not operating to charge or discharge the BESS.

In some cases, equipment operating in the same facility as the BESS may be powered by the BESS. However, at some times the BESS may not have enough stored energy remaining to sufficiently power the equipment. At such times, an operator may request energy from an energy grid. However, depending on the time of day and/or the number of loads that need energy, the energy that is needed to overcome the losses may not be available or may be restricted. Accordingly, the equipment within the renewable energy plant may not be always sufficiently powered during the periods in which the BESS is operating in standby mode.

A processor implementing the systems and methods discussed herein may overcome the aforementioned technical deficiencies by controlling an energy offset system connected to devices within a renewable energy facility. The energy offset system may include one or both of a second BESS or a renewable energy source (RES) (e.g., one or more solar panels, wind turbines, etc.) that can provide power to the devices within the renewable energy facility. Depending on the configuration, the processor may control the energy that is available from the second BESS and/or the renewable energy source to send energy to the devices within the facility. Because the energy offset system includes additional components to the original BESS, the energy offset system may account for any losses the BESS incurs when in an idle state.

In some cases, the processor may be disconnected from the system controlling the BESS in the renewable energy facility. In such cases, the processor may control the added RES and/or second BESS of the energy offset system by reading meter readings of a load energy meter connected in series between the devices the BESS powers and the energy grid. For example, the load energy meter may be configured to read the amount of energy that flows from the BESS to the energy grid and from the energy grid to the BESS or devices through the meter. When the BESS stops charging or discharging through the meter, the energy grid may send energy through the meter to power the devices in the renewable energy facility to make up for any losses the BESS incurs while operating in standby mode. The processor may read the amount of energy the grid provides from the energy meter and direct the read amount of energy to the devices from the energy offset system. By doing so, the grid may stop providing energy to power the devices and instead distribute energy to other loads, thus reducing the stress placed on the grid when ensuring the equipment in the renewable energy facility remains powered.

In some embodiments, the devices operating within the renewable energy facility may not be powered by the BESS at all. For example, the devices may not be connected to the BESS and may instead be connected to the energy offset system, which may be connected to other renewable energy sources in the renewable energy facility and/or the energy grid. The processor controlling the energy offset system may power the devices using the energy offset system until the energy offset system does not have enough power to do so. The processor may then retrieve energy from other renewable energy sources of the renewable energy facility to power the devices. If the other renewable energy sources do not generate enough energy to power the devices, the processor may retrieve energy from the energy grid to power the devices. In this way, the processor may avoid relying on energy from the BESS to power the devices.

Advantageously, by performing the systems and methods described herein, the processor may improve the energy load requirements of the renewable energy power plant without directly integrating a new controller into the renewable energy power plant. By controlling a second BESS and/or renewable energy source to power devices the BESS is configured to provide power, a controller may ensure the devices can continue to operate only by reading the value on the meter between the BESS and the energy grid. This integration may enable a temporary energy offset system to be installed into a renewable energy plant while a new BESS is sized and installed to be able to handle energy losses. The integration may also enable a lay person to integrate the energy offset system into a renewable energy facility without configuring a connection between the controller controlling the BESS and the controller of the energy offset system. In doing so, the energy offset system may provide power to the devices and enable the energy grid to provide energy to other loads, reducing the load requirements placed on the energy grid.

In an aspect, the present disclosure describes a system. The system may comprise a renewable energy power plant coupled to an energy grid, the renewable energy power plant comprising a battery energy storage system (BESS); a device operating within the renewable energy power plant having energy requirements and receiving energy from the BESS; a load energy meter measuring energy provided to the energy grid or received from either the energy grid or a first renewable energy source (RES); a second RES; and a processor, the processor operatively coupled to computer memory and configured by machine-readable instructions to: measure (e.g., read), from the load energy meter, the energy provided to or from the energy grid or the first RES; determine (e.g., based on the measurement) the BESS is not providing enough energy to satisfy the energy requirements of the device; identify, based on the measurement, an amount of energy that is needed to satisfy the energy requirements of the device in combination with the energy provided by the BESS to the device; and direct the identified amount of energy from the second RES to the device.

In some embodiments, the processor is configured to identify the amount of energy that is needed to satisfy the energy requirements of the device by identifying the amount of energy responsive to determining the BESS is not charging or discharging energy to or from the energy grid or the first RES. In some embodiments, the processor is configured to determine the BESS is not charging or discharging energy to or from the energy grid or the first RES by determining the BESS is not charging or discharging energy to or from the energy grid or the first RES based on a charge/discharge schedule for the BESS.

In some embodiments, the processor is configured to determine the BESS is not charging or discharging energy to or from the energy grid or the first RES responsive to a value of the load energy meter being below a threshold. In some embodiments, the processor is further configured to charge a second BESS with energy generated by the second RES during a first time period; determine the BESS is not providing enough energy to satisfy the energy requirements of the device during a second time period subsequent to the first time period; calculate a second amount of energy that is needed to satisfy the energy requirements of the device in combination with energy provided by the BESS; and discharge the calculated second amount of energy from the second BESS to the device during the second time period.

In some embodiments, the processor is configured to determine the BESS is not providing enough energy to satisfy the energy requirements of the device by determining the BESS in combination with the second RES is not providing enough energy to satisfy the energy requirements of the device during the second time period; and wherein the processor is configured to calculate the second amount of energy by calculating the second amount of energy that is needed to satisfy the energy requirements of the device in combination with energy provided by the BESS and the second RES. In some embodiments, the load energy meter is coupled in series between the device and the energy grid.

In another aspect, the present disclosure describes a method. The method may include measuring, by a processor from a load energy meter, energy provided to (e.g., by a battery energy storage system (BESS)) an energy grid or received from either the energy grid or a first renewable energy source (RES) of a renewable energy power plant (e.g., to the BESS or one or more devices); determining by the processor (e.g., based on the measuring), a BESS is not providing enough energy to satisfy energy requirements of a device operating in the renewable energy power plant; identifying, by the processor based on the measuring, an amount of energy that is needed to satisfy the energy requirements of the device in combination with energy provided by the BESS to the device; and directing, by the processor, the identified amount of energy from a second RES to the device.

In some embodiments, identifying the amount of energy that is needed to satisfy the energy requirements of the device comprises identifying, by the processor, the amount of energy responsive to determining the BESS is not charging or discharging energy to or from the energy grid or the first RES. In some embodiments, determining the BESS is not charging or discharging energy to or from the energy grid comprises determining, by the processor, the BESS is not charging or discharging energy to or from the energy grid or the first RES based on a charge/discharge schedule for the BESS. In some embodiments, the method comprises determining, by the processor, the BESS is not charging or discharging energy to or from an RES in addition to or instead of the energy grid by monitoring or retrieving values from the load energy meter.

In some embodiments, the method further comprises charging, by the processor, a second BESS with energy generated by the second RES during a first time period; determining, by the processor, the BESS is not providing enough energy to satisfy the energy requirements of the device during a second time period subsequent to the first time period; calculating, by the processor, a second amount of energy that is needed to satisfy the energy requirements of the device in combination with energy provided by the BESS; and discharging, by the processor, the calculated second amount of energy from the second BESS to the device during the second time period.

In some embodiments, determining the BESS is not providing enough energy to satisfy the energy requirements of the device comprises determining, by the processor, the BESS in combination with the second RES is not providing enough energy to satisfy the energy requirements of the device during the second time period. In some embodiments, calculating the second amount of energy comprises calculating, by the processor, the second amount of energy that is needed to satisfy the energy requirements of the device in combination with energy provided by the BESS and the second RES.

In some embodiments, the method further comprises determining, by the processor, the second time period is a time period in which the second RES does not generate energy; wherein discharging the calculated second amount of energy from the second BESS comprises discharging, by the processor, the calculated second amount of energy from the second BESS in response to determining the second time period is a time period in which the second RES does not generate energy. In some embodiments, measuring the load energy meter comprises measuring, by the processor, the load energy meter coupled in series between the device and the energy grid.

In some embodiments, identifying the amount of energy of energy that is needed to satisfy the energy requirements of the device in combination with energy provided by the BESS is performed at a first time. The method may further include identifying, by the processor at a second time subsequent to the first time, a second amount of energy that is needed to satisfy the energy requirements of the device in combination with energy provided by the BESS, the second amount of energy higher than the amount of energy and resulting from parasitic losses of a transformer of the BESS in an idle state; and directing, by the processor, the identified second amount of energy from the second RES to the device.

In some embodiments, directing the identified amount of energy from the second RES to the device comprises directing, by the processor, the identified amount of energy from the second RES to the device without transferring any energy to the BESS from the second RES. In some embodiments, measuring the energy requirements of the device operating in the renewable energy power plant comprises measuring, by the processor, the energy requirements of heating ventilation and air conditioning (HVAC) devices. In some embodiments, the method further comprises establishing, by the processor, a connection with a second processor controlling the BESS; receiving, by the processor, a state of charge of the BESS or a request for energy from the second processor; and directing, by the processor, energy from the second RES to the BESS based on the received state of charge or the request for energy from the second processor.

In some embodiments, the method further comprises charging a second BESS s with energy generated by the second RES during a first time period; determining the BESS is not providing enough energy to satisfy the energy requirements of the device during a second time period subsequent to the first time period; and during the second time period, discharging, by the processor, energy from the second BESS to the device during the second time period; and increasing, by the processor, the energy being discharged from the second BESS to the device until measuring a value from the load energy meter equal to zero (e.g., approximately zero) or a defined threshold.

In yet another aspect, the present disclosure describes a method. The method may include directing, by a processor, energy from a first renewable energy source (RES) and a battery energy storage system (BESS) to a device operating in a renewable energy power plant, first RES and the BESS connected in series with and/or between the device and a second RES; determining, by the processor, the RES and the BESS are not capable of satisfying energy requirements of the device in the renewable energy power plant; responsive to the determining, retrieving, by the processor, energy from the second RES; and directing, by the processor, the energy from the second RES to the device within the renewable energy power plant.

In some embodiments, the method may include determining, by the processor, the second RES is not capable of satisfying the energy requirements of the device; responsive to the determining the first RES, the BESS, and the second RES are not capable of satisfying the energy requirements of the device, retrieving, by the processor, energy from an energy grid through an energy meter; and directing, by the processor, the energy retrieved from the energy grid through the energy meter to the device.

In some embodiments, the method may include determining, by the processor, the BESS is charging; responsive to the determining the BESS is charging, retrieving, by the processor, second energy from the second RES; and directing, by the processor, the second energy from the second RES to the device within the renewable energy power plant.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

Figure 1A:
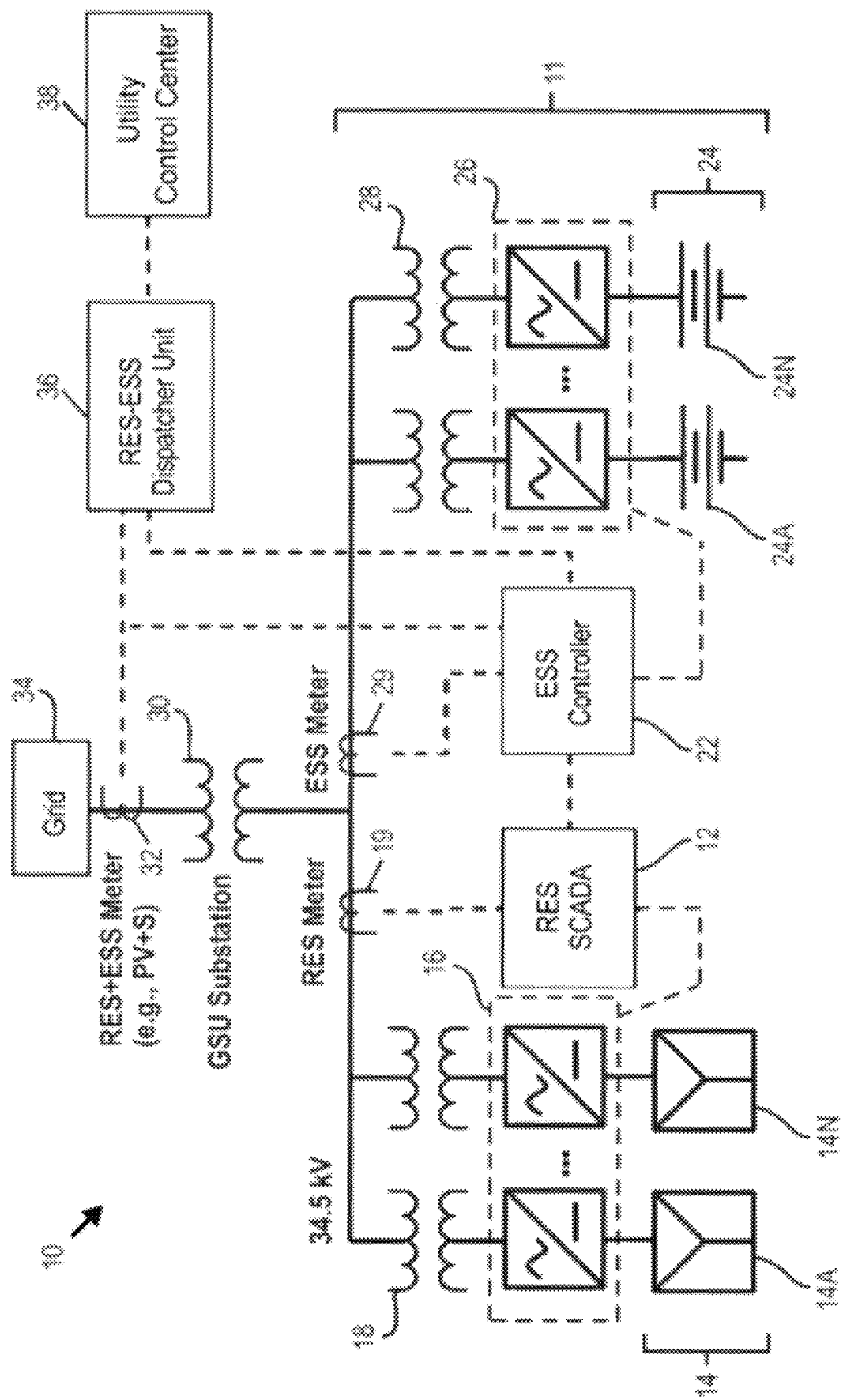
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Energy Offset Management System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast). The RES-ESS dispatcher unit 36 may use the forecast to implement the CCD and other control modes.

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
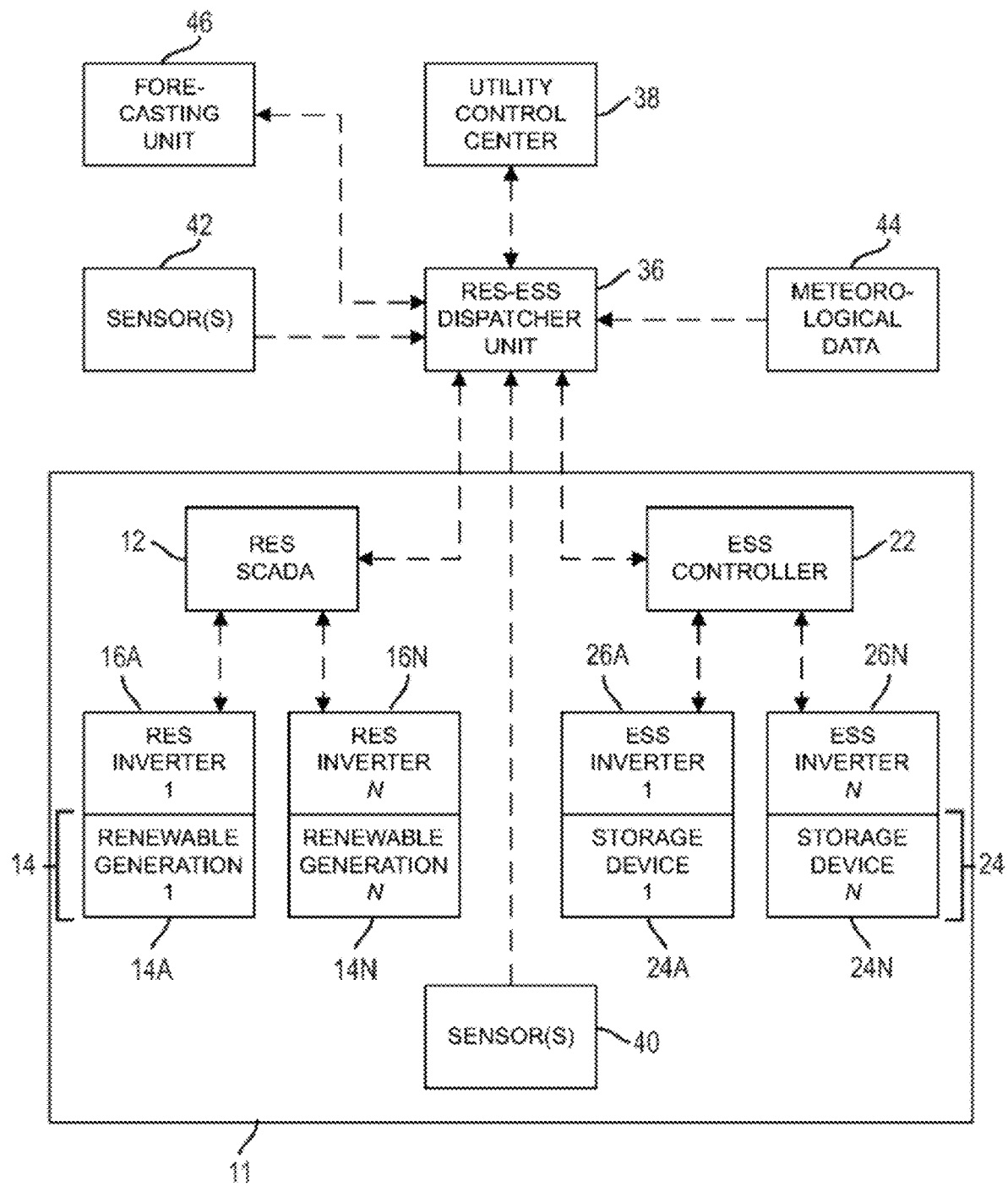
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
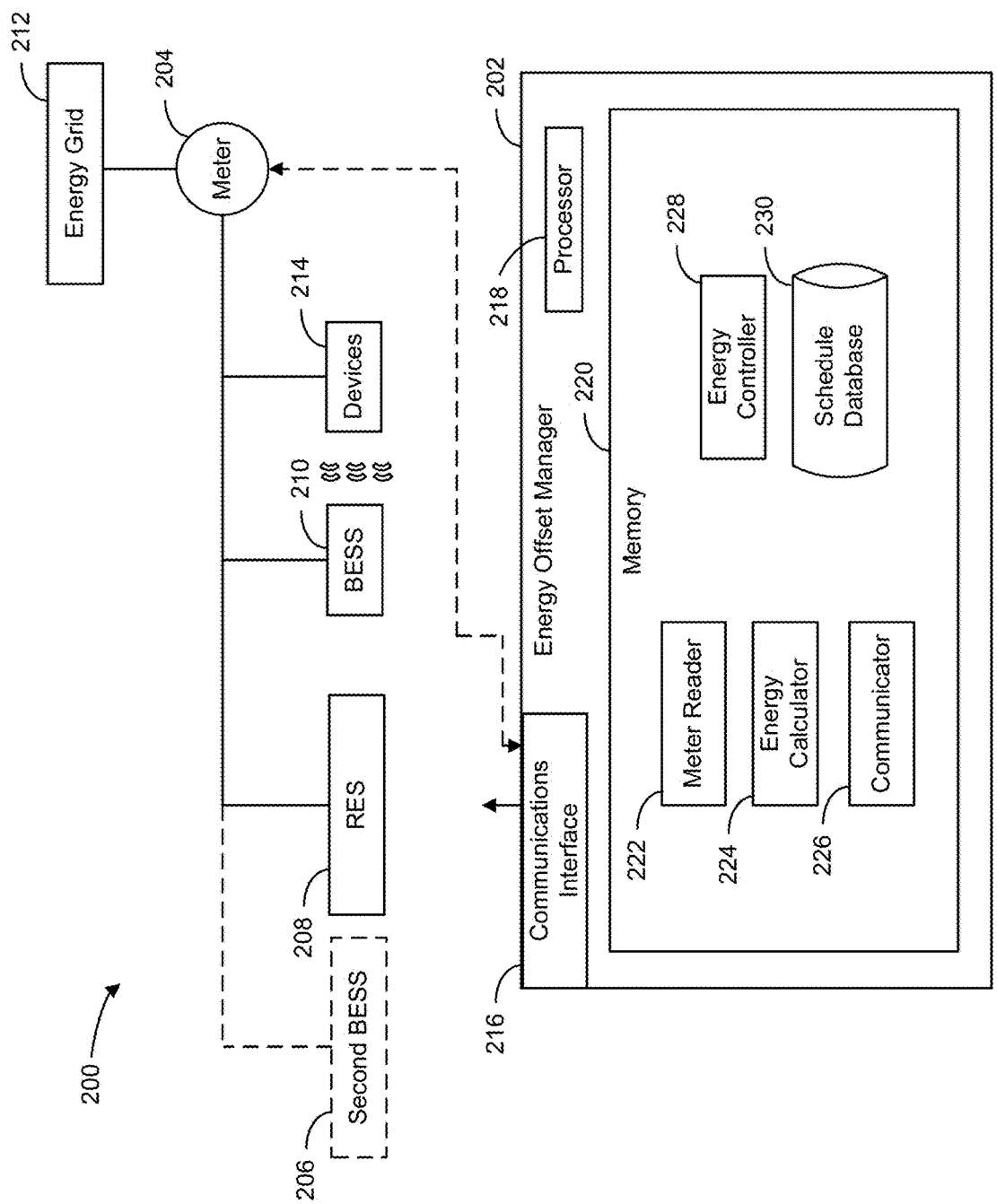
FIG. 2 illustrates a system including an energy offset management system connected to a renewable energy facility, according to some embodiments.

Referring now to FIG. 2, a system 200 for energy offset of parasitic losses is shown, in accordance with some embodiments of the present disclosure. As described herein, renewable energy facility and renewable energy power plant are used interchangeably. In brief overview, the system 200 can include an energy offset manager 202 that communicates with a meter 204, a battery energy storage system (BESS) 206, and/or a renewable energy source (RES) 208. These components may operate together as an auxiliary power source to offset parasitic, and any other, losses that occur in a BESS 210 of a renewable energy facility when the BESS 210 operates in a standby mode (e.g., not charging or discharging energy to an energy grid 212). For example, when the BESS 210 is operating in standby mode, there may be natural energy losses from the BESS such as energy leakage and/or parasitic losses of energy from a transformer of the BESS 210. Because of these losses, the BESS 210 may not be able to satisfy the energy requirements of devices 214 (e.g., heating, ventilation, and/or air equipment) operating within the same renewable energy facility. The energy offset manager 202 may control the second BESS 206 and/or the RES 208 to compensate for the natural losses of the BESS 210 and ensure the energy requirements of the devices 214 are satisfied. The system 200 may include more, fewer, or different components than shown in FIG. 2. For example, there may be any number of client devices or computers that make up or are a part of the energy offset manager 202 or networks in the system 200.

The meter 204 may be or include a load energy meter (described herein as energy meter or meter) that is configured to read the amount of energy that is provided from the BESS 210 to the energy grid 212 and the amount the energy grid 212 provides back through the meter 204. The meter 204 may generate positive readings when energy is flowing to the energy grid 212 and negative values when the meter 204 reads energy flowing from the energy grid, or vice versa. The meter 204 may be similar to or the same as the ESS electrical power meter 29, shown and described with reference to FIG. 1A.

The BESS 210 may be a battery energy storage within the renewable energy facility. The BESS 210 may charge and/or discharge according to a charge/discharge schedule. The BESS 210 may be charged with energy from the energy grid 212 and/or renewable energy sources within the renewable energy facility. The BESS 210 may also operate to provide energy to the energy grid 212. The BESS 210 may store energy in energy storage units (e.g., energy storage units 24, shown and described with reference to FIGS. 1A and 1B). The BESS 210 may include one or more inverters and/or transformers to enable the BESS 210 to provide energy to the energy grid 212 and/or to power the devices 214.

The devices 214 may be or include one or more devices that operate within the renewable energy facility. For example, the devices 214 may include heating, ventilation, or air equipment that operates to maintain a temperature setpoint of the renewable energy facility and/or the BESS 210. The devices 214 may additionally or instead include lights or any other machinery or devices that are connected to an electrical circuit within the renewable energy facility.

The energy offset manager 202 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The energy offset manager 202 can include or utilize at least one processing unit or other logic device such as a programmable logic array engine or a module configured to communicate with one another or other resources or databases. The components of the energy offset manager 202 can be separate components or a single component. The system 200 and its components can include hardware elements, such as one or more processors, logic devices, or circuits.

The energy offset manager 202 may comprise one or more processors that are configured to control charging and/or discharging of the second BESS 206 and/or the RES 208 to provide energy to the devices 214. The energy offset manager 202 may comprise a communications interface 216, a processor 218, and/or memory 220. The energy offset manager 202 may communicate with the meter 204, the second BESS 206, and/or the RES 208, via the communications interface 216 and/or the communicator 226 (e.g., an application programming interface (API)). The processor 218 may be or include an ASIC, one or more FPGAs, a DSP, circuits containing one or more processing components, circuitry for supporting a microprocessor, a group of processing components, or other suitable electronic processing components. In some embodiments, the processor 218 may execute computer code or modules (e.g., executable code, object code, source code, script code, machine code, etc.) stored in the memory 220 to facilitate the activities described herein. The memory 220 may be any volatile or non-volatile computer-readable storage medium capable of storing data or computer code.

The memory 220 may include a meter reader 222, an energy calculator 224, the communicator 226, an energy controller 228, and a schedule database 230. In brief overview, the components 222-230 may cooperate to offset energy losses that occur at the BESS 210 to ensure the power requirements of the devices 214 are satisfied. The components 222-230 may determine a time period in which the BESS 210 is not charging or discharging energy to the energy grid 212 by reading the meter 204. Upon making such a determination, the components 222-230 may identify an amount of energy the devices 214 needs for the energy requirements of the device to be satisfied. The components 222-230 may do so, for example, by identifying the amount from a reading of the meter 204. The components 222-230 may then direct the identified amount from one or both of the second BESS 206 or the RES 208 to satisfy the energy requirements of the devices 214.

The meter reader 222 may comprise programmable instructions that, upon execution, cause the processor 218 to read or measure values from the meter 204. The meter reader 222 may measure energy provided to or from the energy grid 212 by reading values from the meter 204. The meter reader 222 may measure the energy provided to or from the energy grid 212 by polling a meter 204 connected (e.g., connected in series) between the energy grid 212 and the BESS 210 and/or devices 214 operating within the renewable energy facility. The meter reader 222 may transmit a signal to the meter 204 requesting a value that indicates the amount of energy that is being delivered to or from the energy grid 212. The meter 204 may receive the signal, measure the energy flowing across the meter 204 as a value, and transmit the value back to the meter reader 222.

The energy calculator 224 may comprise programmable instructions that, upon execution, cause the processor 218 to calculate the amount of energy to direct from the second BESS 206 and/or the RES 208 to satisfy the energy requirements of the devices 214. The energy calculator 224 may determine if a BESS 210 operating within the renewable energy facility is charging or discharging energy to the energy grid 212. In some embodiments, the energy calculator 224 may do so by determining if the measured value (e.g., an absolute value of the measured value) from the meter 204 is below a threshold value. The energy calculator 224 may compare the value to the threshold and determine the BESS 210 is not charging or discharging if the value is below the threshold value. In some embodiments, the energy calculator 224 may determine if the BESS 210 is charging or discharging based on a charging/discharging schedule. The energy calculator 224 may retrieve such a charging/discharging schedule from the schedule database 230 (e.g., a relational database containing charging/discharging schedules of the BESS 210 for different time periods). For example, the energy calculator 224 may maintain an internal clock. The energy calculator 224 may read the internal clock to determine the current time. The energy calculator 224 may compare the current time to a charging/discharging schedule either stored locally in schedule database 230 or retrieved from a controller controlling the BESS 210 to determine if the BESS 210 is currently charging or discharging. The energy calculator 224 may determine if the BESS 210 is charging or discharging using any method. In this way, the energy calculator 224 may determine if the BESS 210 is currently charging or discharging.

If the energy calculator 224 determines the BESS 210 is not charging or discharging the energy calculator 224 may determine if the energy requirements of devices operating within the renewable energy facility are satisfied by the BESS 210. The devices 214 may be or include one or more devices of the renewable energy facility that operate within the renewable energy facility. Examples of devices may include heating, ventilation, and air conditioning equipment, lighting equipment, and/or any other devices operating within the renewable energy facility. Such devices may be powered by the BESS 210 and, when the BESS 210 does not provide enough energy to the devices 214, by energy from the energy grid 212.

The energy calculator 224 may determine if the energy requirements of devices operating within the renewable energy facility are satisfied by identifying the value the energy calculator 224 measured from the meter 204. If the value is not zero (e.g., not approximately zero), the energy calculator 224 may determine the BESS 210 is not providing enough energy to power the devices 214. Instead, the energy calculator 224 may determine the devices 214 are pulling energy from the energy grid 212, which is what the reading from the meter 204 may indicate. In some embodiments, to account for transient energy and/or other readings by the meter 204, the energy calculator 224 may implement a second threshold. The energy calculator 224 may compare the value read from the meter 204 to the second threshold. The energy calculator 224 may determine the energy requirements of the devices 214 within the renewable energy facility are not met in response to determining the value exceeds the second threshold.

If the energy calculator 224 determines the energy requirements of devices 214 operating within the renewable energy facility are not being met, the energy calculator 224 may identify a value indicating the amount of energy the devices 214 need for the devices' 214 energy requirements to be satisfied. The energy calculator 224 may do so by identifying the value the energy calculator 224 measured from the meter 204. In some embodiments, to account for transience and/or for imperfect meter readings, the energy calculator 224 may subtract a defined value (e.g., a buffer) from the value measured from the meter 204. In some embodiments, the defined value may be the second threshold used to determine whether the devices' 214 energy requirements are being satisfied by energy from the BESS 210, as described above. The energy calculator 224 may identify the subtracted value as the amount of energy that is needed to satisfy the energy requirements of the devices 214 within the renewable energy facility.

The energy calculator 224 may identify an amount of energy that is available from the RES 208. The energy calculator 224 may query the RES 208 for data that indicates how much energy the RES 208 has generated or is generating. In some embodiments, the energy calculator 224 may maintain a database and continuously retrieve how much energy the RES 208 has generated or is generating. In some embodiments, the energy calculator 224 may calculate and/or maintain a forecast of the amount of energy the RES 208 may generate based on different types of data (e.g., weather forecasts when the RES 208 includes one or more solar panels). In such embodiments, the energy calculator 224 may identify the amount of energy the RES 208 has generated or has stored from the forecast.

The energy calculator 224 may determine if the RES 208 has enough available energy to satisfy the energy requirements of the devices 214 in the renewable energy facility. The energy calculator 224 may compare the identified amount of energy the RES 208 has available with the value the energy calculator 224 identified from the meter 204. If the amount of energy the RES 208 has available is equal to or exceeds the value identified from the meter 204, the energy calculator 224 may determine the RES 208 has generated or is generating enough energy to satisfy the energy requirements of the devices 214 in tandem with energy the BESS 210 is providing the devices 214. Accordingly, the energy controller 228 may direct an amount of energy equal to or a buffer amount above the value the energy calculator 224 identified from the meter 204 to satisfy the energy requirements of the devices 214.

If the energy calculator 224 determines the RES 208 cannot generate enough energy to satisfy the energy requirements of the devices 214, the energy controller 228 may discharge the second BESS 206. The energy controller 228 may comprise programmable instructions that, upon execution, cause the processor 218 to direct energy from the second BESS 206 and/or the RES 208 to the devices 214. The energy controller 228 may direct energy from the RES 208 to the second BESS 206 when the RES 208 is not providing energy to the devices 214 of the renewable energy facility. The second BESS 206 may store the energy from the RES 208. When the energy calculator 224 determines the RES 208 is not generating enough energy to satisfy the energy requirements of the devices 214 within the renewable energy facility, the energy controller 228 may calculate the amount of energy that is still needed to satisfy the energy requirements of the devices 214 by subtracting the amount of energy the RES 208 can provide from the amount of energy the devices 214 need for their energy requirements to be satisfied. The energy controller 228 may then discharge the calculated amount of energy (or the calculated amount with an added buffer) from the second BESS 206 to the devices 214, thus ensuring the devices 214 are properly powered despite the BESS 210 of the renewable energy facility not storing enough energy. If the second BESS 206 does not have enough energy, the energy controller 228 may retrieve the remaining energy that is needed from the energy grid 212.

In some embodiments, the energy controller 228 discharges energy from the second BESS 206 in response to determining the RES 208 is operating in a time period in which the RES 208 does not generate energy (e.g., at night or during a cloudy day). The energy calculator 224 may determine the RES 208 is not generating energy based on an energy forecast and/or a weather forecast for the time period (e.g., by identifying an indication that the RES 208 is not generating energy during the time period from the energy forecast and/or by identifying a time period from the weather forecast indicating there will be an amount of sunlight below a threshold available to generate energy). Upon determining the RES 208 is not generating energy, the energy controller 228 may discharge the amount of energy that is needed to power the devices 214 within the renewable energy plant from the second BESS 206 to ensure the devices 214 may maintain operation.

In some embodiments, the energy offset manager 202, the second BESS 206, and/or the RES 208 may not be connected to the BESS 210 or the meter 204. Instead, the components 202, 206, and 208 may be connected to a renewable energy side of the renewable energy facility. The renewable energy side may contain legacy renewable energy sources and/or a meter that measures renewable energy that is provided from the renewable energy sources of the renewable energy facility to various loads and/or the energy grid 212. The devices 214 may be disconnected from the BESS 210 and the meter 204 and connected to receive power from the second BESS 206 and/or the RES 208. In such embodiments, the second BESS 206 and/or the RES 208 may be sized to power the devices 214 without any power from the energy grid 212 or the BESS 210, thus avoiding causing an extra load on the energy grid 212 or the BESS 210.

For example, the energy offset manager 202 may direct energy from the RES 208 and/or the second BESS 206 to the devices 214 operating within the renewable energy facility. The RES 208 may be configured to generate energy and charge the second BESS 206 with the generated energy. The energy offset manager 202 may control the RES 208 and BESS 206 separately from any controller that controls other renewable energy sources of the renewable energy facility (e.g., a legacy controller and legacy renewable energy sources). Accordingly, the energy offset manager 202 in combination with the RES 208 and BESS 206 may operate as an "add-on" to legacy equipment at the renewable energy facility to ensure the devices 214 operating within the facility are sufficiently powered. The energy offset manager 202 may direct energy from the RES 208 and the second BESS 206 to the devices 214 to power the devices 214 instead of relying on energy from the BESS 210, which may not always have enough energy available to power the devices 214 (e.g., such as because of parasitic losses, as described above).

The energy offset manager 202 may determine if the second BESS 206 and the RES 208 are providing enough energy to satisfy the energy requirements of the devices 214. In some embodiments, the energy offset manager 202 may do so by communicating with a meter that reads the amount of energy the second BESS 206 and/or the RES 208 provide to the devices 214 and comparing the read amount to a stored value in memory. In some embodiments, the energy offset manager 202 may do so by communicating with the devices 214 themselves and querying for a power reading from the devices 214. The energy offset manager 202 may determine if the devices 214 are receiving enough energy in any manner.

If the energy offset manager 202 determines the devices 214 are not receiving enough energy from the RES 208 and/or the second BESS 206, the energy offset manager 202 may retrieve energy from a second RES (e.g., a legacy RES) of the renewable energy facility. The energy offset manager 202 may identify the amount of energy that is needed to satisfy the energy requirements of the devices 214 in addition to energy from the second BESS 206 and/or the RES 208 (e.g., based on a difference between the energy requirements and the amount of energy the second BESS 206 and/or the RES 208 are providing and/or based on a measured value the devices 214 or an energy meter provides indicating an amount of energy the devices 214 need). The energy offset manager 202 may establish a connection with the controller controlling the legacy renewable energy sources of the renewable energy plant and request the amount of energy the devices 214 need to operate and that the new BESS 206 and RES 208 are not capable of providing. Upon receiving the request, the new controller may direct energy to or through the same bus as the second BESS 206 and RES 208. The energy offset manager 202 may direct the energy to the devices 214 to power the devices 214.

The energy offset manager 202 may determine if the energy from the legacy renewable energy sources, the new BESS 206, and the new RES 208 are supplying enough energy to satisfy the energy requirements of the devices 214. In some embodiments, the energy offset manager 202 may make this determination in a similar manner to how the energy offset manager 202 determined if the devices' 214 energy requirements were satisfied. In some embodiments, the energy offset manager 202 may do so after the controller transmits a message to the energy offset manager 202 indicating the legacy renewable energy sources are not generating enough energy or do not have enough energy stored to satisfy the remaining energy requirements of the devices 214.

Otherwise, if the energy offset manager 202 determines the devices 214 are not receiving enough energy from the RES 208, the second BESS 206, and/or the legacy RES's, the energy offset manager 202 may retrieve energy from the energy grid 212. The energy offset manager 202 may identify the amount of energy that is needed to satisfy the energy requirements of the devices 214 in addition to energy from the second BESS 206, the RES 208, and/or the legacy RES's (e.g., based on a difference between the energy requirements and the amount of energy the second BESS 206 and/or the RES 208 are providing and/or based on a measured value the devices 214 or an energy meter provides indicating an amount of energy the devices 214 need). The energy offset manager 202 may transmit a signal to a utility controller controlling an energy grid 212 requesting the identified amount of energy that is needed to satisfy the energy requirements of the devices 214. The utility controller may in turn direct energy through the second BESS 206 and/or RES 208 to the devices 214 and, the energy offset manager 202 may direct the energy from the energy grid 212 to the devices 214.

Figure 3:
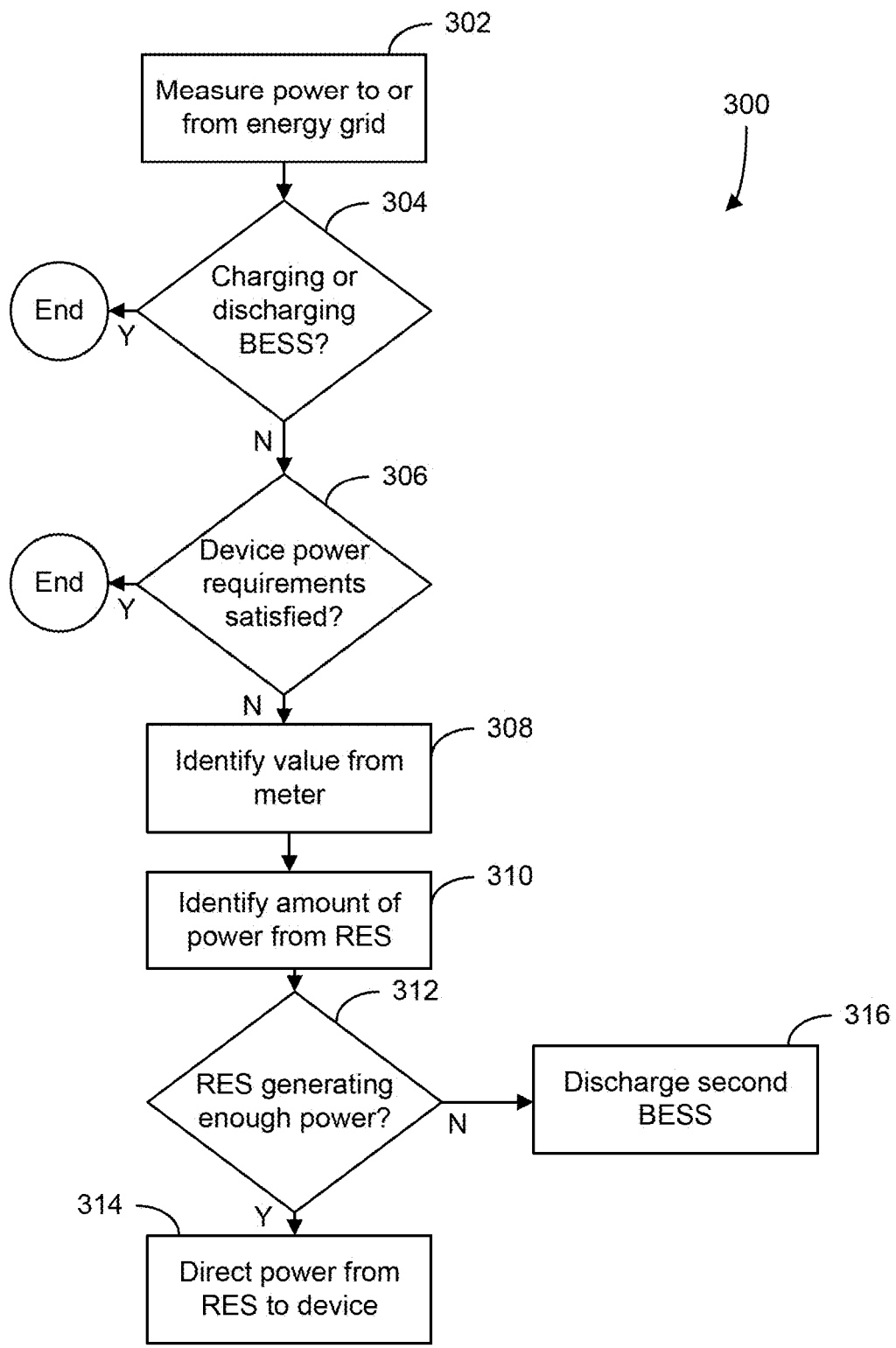
FIG. 3 illustrates a flowchart of an example method for offsetting parasitic energy losses of a battery energy storage system, according to some embodiments.

FIG. 3 illustrates a method 300 for offsetting parasitic energy losses of a battery energy storage system, according to some embodiments. The method 300 can be performed by a data processing system (e.g., a controller, the RES –ESS dispatcher unit 36, the ESS controller 22, the RES SCADA controller 12, the computer 1100, the energy offset manager 202, etc.). In some embodiments, the data processing system is the controller of a renewable energy plant that contains a BESS. The data processing system may operate to offset the energy losses that naturally occur in a BESS or other devices of a renewable energy facility. The data processing system may do so to ensure devices operating within the facility may be sufficiently powered without requiring power from an energy grid, even when the BESS providing power to the devices is not able to provide enough power to the devices. Performance of method 300 may enable the data processing system to operate "behind-the-meter" of a renewable energy facility, in some cases without directly communicating with any devices in the renewable energy facility itself, except for a load energy meter. Accordingly, performance of the method 300 may enable an operator to ensure devices within the renewable energy facility are sufficiently charged without significant setup or configuration changes to the facility itself. The method 300 may include more or fewer operations and the operations may be performed in any order.

At operation 302, the data processing system measures power or energy provided to or from an energy grid. The data processing system may measure the power provided to or from the energy grid by polling an energy meter connected (e.g., connected in series) between the energy grid and a BESS and/or devices operating within a renewable energy facility. The data processing system may transmit a signal to the energy meter requesting a value that indicates the amount of energy that is being delivered to or from the energy grid. The energy meter may receive the signal, measure the power flowing across the meter as a value, and transmit the value back to the data processing system. In some embodiments, the energy meter may transmit a positive value to the data processing system if the BESS is discharging power to the grid and a negative value if the energy grid is providing power to the BESS or devices within the renewable energy facility, or vice versa. In some embodiments, the BESS operating within the renewable energy facility may receive power for charging across the energy meter from a renewable energy source (e.g., a legacy renewable energy source). In such embodiments, the measurements from the energy meter may correspond to or represent power from the renewable energy source in addition to or instead of the energy grid.

At operation 304, the data processing system determines if a BESS operating within the renewable energy facility is charging or discharging power to the energy grid or a renewable energy source (e.g., a legacy renewable energy source) within the renewable energy facility. In some embodiments, the data processing system may do so by determining if the measured value (e.g., an absolute value of the measured value) from the meter is below a threshold value. The data processing system may compare the value to the threshold and determine the BESS is not charging or discharging if the value is below the threshold value. In some embodiments, the data processing system may determine if the BESS is charging or discharging based on a charging/discharging schedule. For example, the data processing system may maintain an internal clock. The data processing system may read the internal clock to determine the current time. The data processing system may compare the current time to a charging/discharging schedule either stored locally in memory or retrieved from a controller controlling the BESS to determine if the BESS is currently charging or discharging. In this way, the data processing system may determine if the BESS is currently charging or discharging.

If the data processing system determines the BESS is currently charging or discharging (e.g., charging power or energy from the energy grid or discharging power or energy to the energy grid), the data processing system may stop performing the method 300. However, if the data processing system determines the BESS is not charging or discharging, at operation 306, the data processing system determines if the energy requirements of devices operating within the renewable energy facility are satisfied by the BESS. The device may be or include one or more devices of the renewable energy facility that operate within the renewable energy facility. Examples of devices may include heating, ventilation, and air conditioning equipment, lighting equipment, and/or any other devices operating within the renewable energy facility. Such devices may be powered by the BESS and, when the BESS does not provide enough energy to the devices, by energy from the energy grid.

The data processing system may determine if the energy or power requirements of devices operating within the renewable energy facility are satisfied by identifying the value the data processing system measured from the energy meter in operation 302. If the value is not zero (e.g., not approximately zero), the data processing system may determine the BESS is not providing enough energy to power the devices. Instead, the data processing system may determine devices are pulling energy from the energy grid, which is what the reading from the energy meter may indicate. In some embodiments, to account for transient energy and/or other readings by the meter, the data processing system may implement a second threshold. The data processing system may compare the value read from the meter to the second threshold. The data processing system may determine the energy requirements of the devices within the renewable energy facility are not met in response to determining the value exceeds the second threshold.

If the data processing system determines the energy or power requirements of the devices within the renewable energy facility are being met, the data processing system may stop performing method 300. However, if the data processing system determines the energy or power requirements of devices operating within the renewable energy facility are not being met, at operation 308, the data processing system may identify a value indicating the amount of energy the devices need for their energy requirements to be satisfied. The data processing system may do so by identifying the value the data processing system measured from the energy meter, from a schedule, or through any other means. In some embodiments, to account for transience and/or for imperfect energy meter readings, the data processing system may subtract a defined value (e.g., a buffer) from the value measured from the energy meter. In some embodiments, the defined value may be the second threshold used to determine whether the devices' energy requirements are being satisfied by energy from the BESS, as described above. The data processing system may identify the subtracted value as the amount of energy that is needed to satisfy the energy requirements of the devices within the renewable energy facility.

At operation 310, the data processing system identifies an amount of energy or power that is available from an RES. The RES may be one or more solar panels, windmills, or any other renewable energy source that generates energy and that is controlled by the data processing system. The data processing system may query the renewable energy source for data that indicates how much energy the RES has generated and/or stored. In some embodiments, the data processing system may maintain a database and continuously retrieve how much energy the RES is generating or has stored in a second BESS. In some embodiments, the data processing system may calculate and/or maintain a forecast of the amount of energy the RES may generate or have stored based on different types of data (e.g., weather forecasts when the RES includes one or more solar panels). In such embodiments, the data processing system may identify the amount of energy the RES has generated or has stored from the forecast.

At operation 312, the data processing system determines if the RES is generating enough available energy to satisfy the energy requirements of the devices in the renewable energy facility. The data processing system may compare the identified amount of energy the RES is generating with the value the data processing system identified from the energy meter. If the amount of energy the RES is generating is equal to or exceeds the value identified from the energy meter, the data processing system may determine the RES has generated or is generating enough energy to satisfy the energy requirements of the devices in tandem with energy the BESS is providing the devices. Accordingly, at operation 314, the data processing system directs an amount of energy or power equal to or a buffer amount above the value the data processing system identified from the energy meter to satisfy the energy requirements of the devices. In directing the amount of energy or power equal to or a buffer amount above the value the data processing system identified from the energy meter to the device, the data processing system can cause the energy meter to read a value of zero. The data processing system can continuously monitor the energy meter and direct energy or power to cause the energy meter to read a value of zero over time or for a defined time period.

If the data processing system determines the RES has not or is not generating enough energy or power to satisfy the energy requirements of the devices, at operation 316, the data processing system discharges a second BESS. The second BESS may be a BESS that is coupled to the RES and that is charged with energy generated by the RES. The data processing system may direct energy from the RES to the second BESS when the RES is not providing energy to the devices of the renewable energy facility. The second BESS may store the energy from the RES. When the data processing system determines the RES is not generating enough energy to satisfy the energy requirements of the devices within the renewable energy facility, the data processing system may calculate the amount of energy that is still needed to satisfy the energy requirements of the devices by subtracting the amount of energy the RES can provide from the amount of energy the devices need for their energy requirements to be satisfied. The data processing system may then discharge the calculated amount of energy (or the calculated amount with an added buffer) from the second BESS to the devices, thus ensuring the devices are properly powered despite the BESS of the renewable energy facility not storing enough energy. If the second BESS does not have enough energy, the data processing system may retrieve the remaining energy that is needed from the grid.

In some embodiments, the data processing system may control the RES to curtail the RES s output while the RES supplies energy or power to the devices. In doing so, the data processing system may leave some capacity to increase the output of the RES. In such embodiments, responsive to determining the BESS is not sending power or energy to the energy grid or receiving power or energy from the energy grid and/or determining the energy or power requirements of the device are not met, the data processing system may increase the possible output (e.g., decrease curtailing of) the RES to enable the RES to supply additional power or energy to the device. The data processing system may decrease curtailing of the RES by the amount read by the energy meter (which may change over time as the RES generates more energy), for example. Accordingly, the data processing system may dynamically change the energy output by the RES to supply power to the device.

In some cases, the data processing system may not be able to reduce curtailing enough to satisfy the energy requirements of the device. In such cases, the data processing system may discharge energy from the second BESS to power the device in addition to or instead of the RES and/or the BESS.

In some embodiments, the data processing system discharges energy from the BESS in response to determining the RES is operating in a time period in which the RES does not generate energy (e.g., at night or during a cloudy day). The data processing system may determine the RES is not generating energy based on an energy forecast and/or a weather forecast for the time period (e.g., by identifying an indication that the RES is not generating energy during the time period from the energy forecast and/or by identifying a time period from the weather forecast indicating there will be an amount of sunlight below a threshold available to generate energy). Upon determining the RES is not generating energy, the data processing system may discharge the amount of energy that is needed to power the devices within the renewable energy plant from the second BESS to ensure the devices may maintain operation.

In some embodiments, the data processing system may continuously monitor the energy meter as the RES and/or the second BESS are supplying energy to the devices. The data processing system may do so because the energy requirements of the devices within the renewable energy facility may fluctuate over time. The data processing system may repeat the method 300 as the data processing system identifies new values measured by the energy meter and adjusts the amount of energy the RES and the second BESS provide the devices, thus enabling the devices to operate as their energy requirements change.

For example, after directing energy or power from the RES or the BESS to the devices within the renewable energy facility, the data processing system may measure the energy meter to determine if enough energy is being directed to the devices. The directed amount of energy may not be enough because of a fluctuation in the energy requirements of the devices and/or because of increased parasitic losses at one or more transformers of the BESS that reduce the amount of energy the BESS can provide the devices while in an idle state. The data processing system may identify the value from the meter and direct energy equal to (or with a defined buffer to account for unintended losses) to the devices from the RES and/or the BESS to ensure the devices can remain sufficiently powered to operate.

In some embodiments, instead of determining how much energy to deliver to the devices within the renewable energy facility, the data processing system may increase (or decrease) the energy from the RES and/or the second BESS until the load energy meter reaches zero (e.g., approximately zero) or a defined threshold. For example, upon determining the devices energy requirements are not satisfied from a measurement of the meter, the data processing system may begin discharging energy to the devices from the RES and/or the second BESS. As the data processing system is doing so, the data processing system may monitor or continuously measure values from the meter. The data processing system can increase the energy being discharged from the RES and/or the second BESS until the value reaches a threshold (e.g., a defined threshold) or zero (e.g., approximately zero). Upon determining or receiving a value equal to the threshold or zero, the data processing system may stop increasing the amount of energy being discharged or stop discharging the energy altogether. In this way, the data processing system can power the devices within the renewable energy facility without calculating the amount of energy that is needed to do so.

Figure 4:
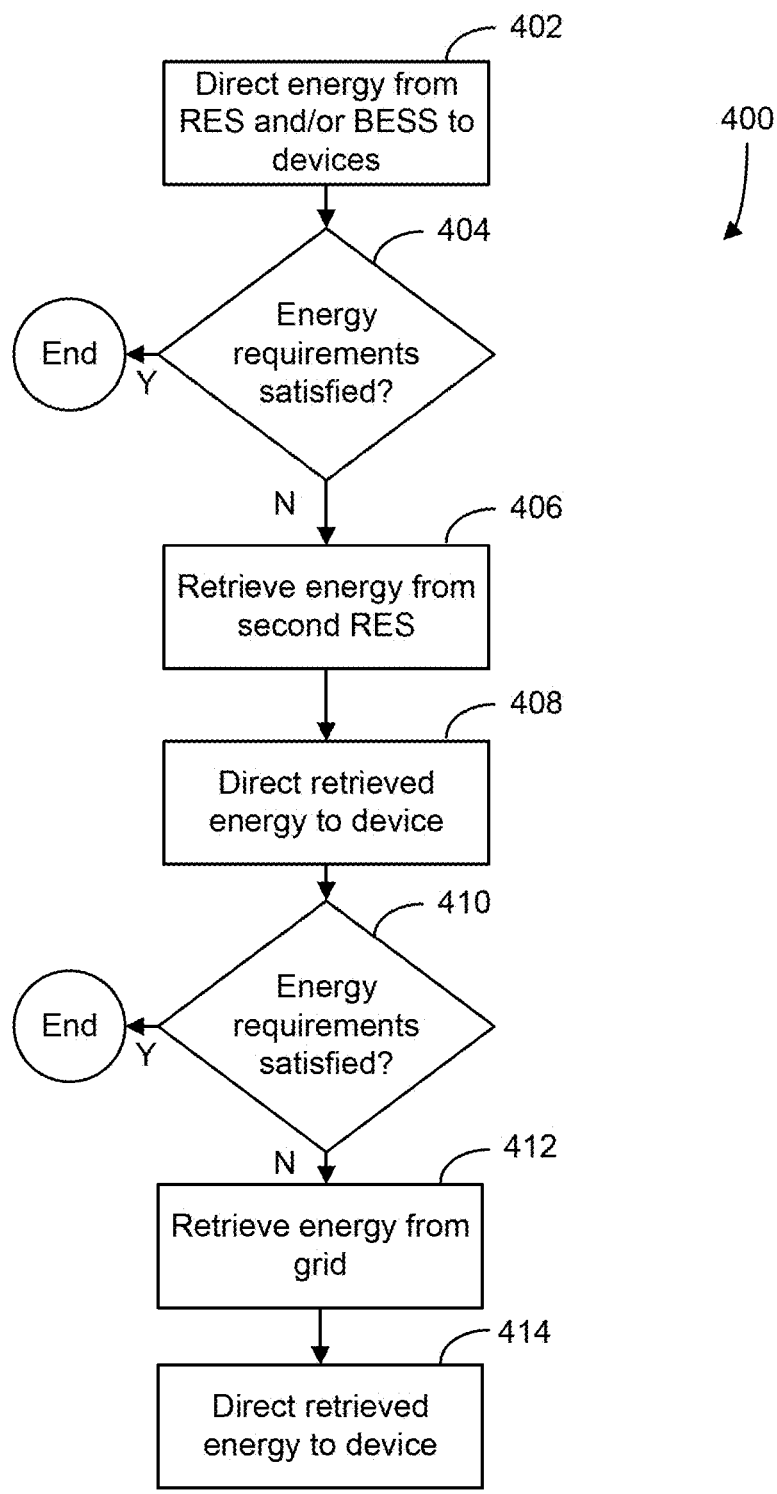
FIG. 4 illustrates a flowchart for powering devices within a renewable energy power plant, according to some embodiments.

FIG. 4 illustrates a method 400 for powering devices within a renewable energy power plant, according to some embodiments. The method 400 can be performed by a data processing system (e.g., a controller, the RES –ESS dispatcher unit 36, the ESS controller 22, the RES SCADA controller 12, the computer 1100, the energy offset manager 202, etc.). In some embodiments, the data processing system is the controller of a renewable energy plant that contains a BESS. The data processing system may operate to power devices within a renewable energy power plant using energy from a renewable energy source and/or a BESS charged by the renewable energy source. The data processing system may provide enough energy to power the devices of the renewable energy facility from the RES and/or the BESS. If the RES and/or the BESS do not have enough energy available, the data processing system may direct energy from other renewable energy sources of the renewable energy facility to the devices. If the renewable energy sources do not have enough energy, the data processing system may retrieve energy from an energy grid to power the devices. In this way, the data processing system may enable renewable energy sources to power devices operating within a renewable energy facility without relying on any energy from a BESS stored within the renewable energy facility. The method 400 may include more or fewer operations and the operations may be performed in any order.

At operation 402, the data processing system directs energy from an RES and/or a BESS to devices operating within a renewable energy facility. The devices may be any type of devices that operate within the renewable energy facility, as are described above. The RES may be configured to generate energy and charge the BESS with the generated energy. The RES and BESS may be connected to a "renewable energy" side of the renewable energy facility that provides energy to and receives energy from an energy grid through an energy meter that is specific to the renewable energy sources (e.g., a meter that does not measure the energy the energy grid provides to a BESS of the renewable energy facility). The data processing system may control the RES and BESS separately from any controller that controls other renewable energy sources of the renewable energy facility (e.g., a legacy controller and legacy renewable energy sources). Accordingly, the data processing system in combination with the RES and BESS may operate as an "add-on" to legacy equipment at the renewable energy facility to ensure the devices operating within the facility are sufficiently powered. The data processing system may direct energy from the RES and the BESS to the devices to power the devices instead of relying on energy from a legacy BESS, which may not always have enough energy available to power the devices (e.g., such as because of parasitic losses, as described above).

At operation 404, the data processing system determines if the BESS and the RES are providing enough energy to satisfy the energy requirements of the devices. In some embodiments, the data processing system may do so by communicating with a meter that reads the amount of energy the BESS and/or the RES provide to the devices and comparing the read amount to a stored value in memory. In some embodiments, the data processing system may do so by communicating with the devices themselves and querying for a power reading from the devices. The data processing system may determine if the devices are receiving enough energy in any manner. If the data processing system determines the devices are receiving enough energy from the RES and/or the BESS, the data processing system may stop performing the method 400.

Otherwise, if the data processing system determines the devices are not receiving enough energy from the RES and/or the BESS, at operation 406, the data processing system retrieves energy from a second RES (e.g., a legacy RES) of the renewable energy facility. The data processing system may identify the amount of energy that is needed to satisfy the energy requirements of the devices in addition to energy from the BESS and/or the RES (e.g., based on a difference between the energy requirements and the amount of energy the BESS and/or the RES are providing and/or based on a measured value the devices or an energy meter provides indicating an amount of energy the devices need). The data processing system may establish a connection with the controller controlling the legacy renewable energy sources of the renewable energy plant and request the amount of energy the devices need to operate and that the new BESS and RES are not capable of providing. Upon receiving the request, the new controller may direct energy to or through the same bus as the BESS and RES. At operation 408, the data processing system may direct the energy to the devices to power the devices.

At operation 410, the data processing system determines if the energy from the legacy renewable energy sources, the new BESS, and the new RES are supplying enough energy to satisfy the energy requirements of the devices. In some embodiments, the data processing system may make this determination in a similar manner to how the data processing system determined if the devices' energy requirements were satisfied at operation 404. In some embodiments, the data processing system may do so after the controller transmits a message to the data processing system indicating the legacy renewable energy sources are not generating enough energy or do not have enough energy stored to satisfy the remaining energy requirements of the devices. If the data processing system determines the energy requirements of the devices are satisfied, the data processing system may stop performing the method 400.

Otherwise, if the data processing system determines the devices are not receiving enough energy from the RES, the BESS, and/or the legacy RES's, at operation 412, the data processing system retrieves energy from the energy grid. The data processing system may identify the amount of energy that is needed to satisfy the energy requirements of the devices in addition to energy from the BESS, the RES, and/or the legacy RES's (e.g., based on a difference between the energy requirements and the amount of energy the BESS and/or the RES are providing and/or based on a measured value the devices or an energy meter provides indicating an amount of energy the devices need). The data processing system may transmit a signal to a utility controller controlling an energy grid requesting the identified amount of energy that is needed to satisfy the energy requirements of the devices. The utility controller may in turn direct energy through the BESS and/or RES to the devices and, at operation 414, the data processing system directs the energy from the grid to the devices.

In some embodiments, the data processing system discharges energy from the legacy RESs upon determining the RES is charging (e.g., currently charging) the BESS. For example, the data processing system may direct the RES to charge the BESS. The RES and the BESS may not be able to power the devices while the RES charges the BESS. In such cases, the data processing system may retrieve and direct energy from the legacy RESs to power the devices. The data processing system stop retrieving and directing energy from the legacy RESs and resume directing energy from the RES and BESS upon the BESS being sufficiently charged (e.g., responsive to determining the BESS is charged to a defined threshold).

Advantageously, by connecting a new RES, BESS, and/or controller between devices operating within a renewable energy facility and renewable energy sources already connected to the facility, the data processing system may power the devices without relying on any energy from the BESS that is within the facility and is susceptible to parasitic losses. Instead, the RES, BESS, and controller may operate as a self-containing energy source that can power the devices alone or communicate with legacy equipment and/or, if necessary, the energy grid to provide energy to the devices. This configuration may enable the devices to be sufficiently powered using renewable energy as the main source of energy and energy from the energy grid only in certain situations. Accordingly, less energy may be required from the energy grid, enabling the grid to provide energy to other loads, thus reducing the peak load requirements of the energy grid and increasing the availability of energy on the grid.

Figure 5:
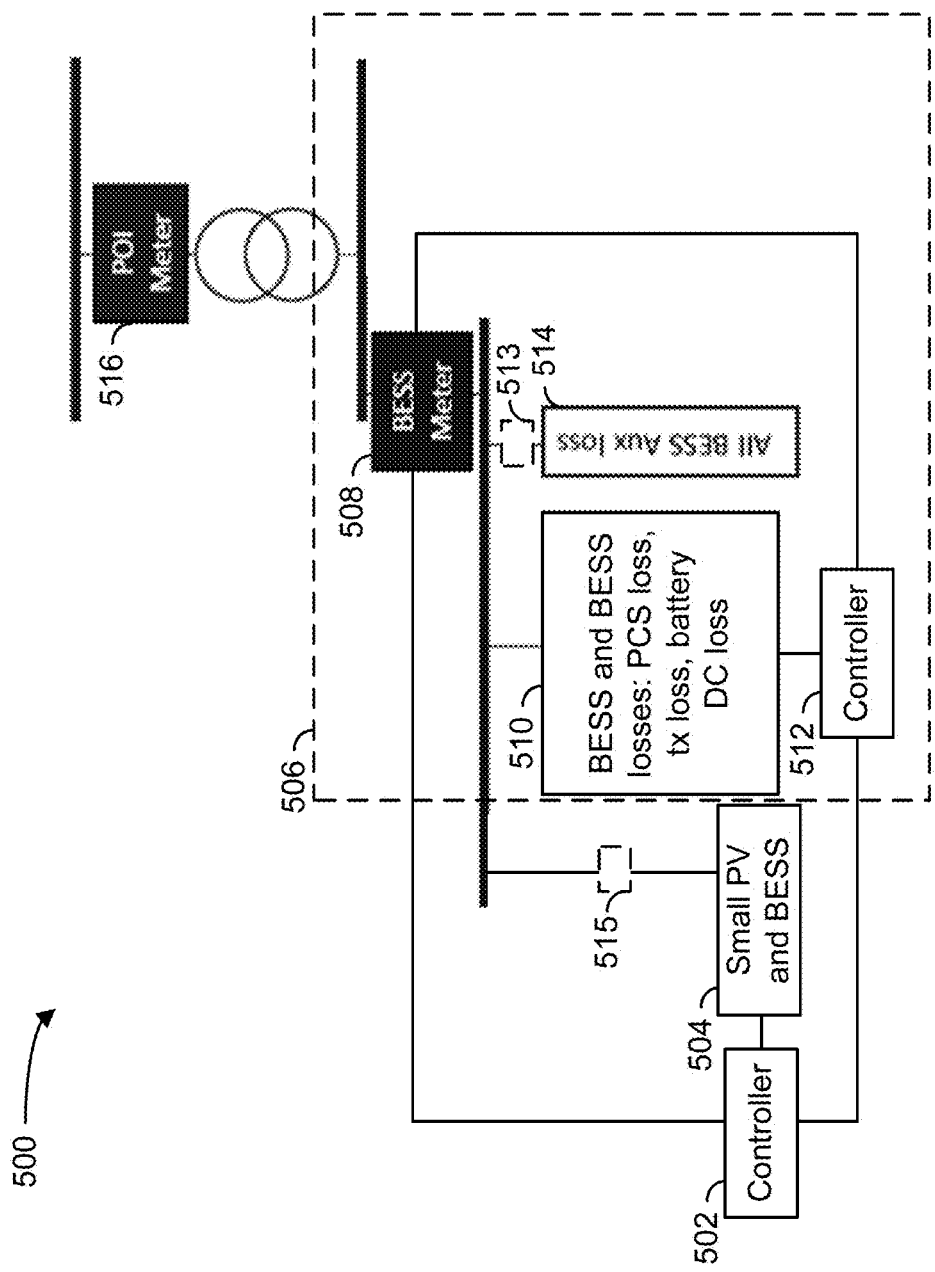
FIG. 5 illustrates an example system including an energy offset management system connected to a renewable energy facility, according to some embodiments.

FIG. 5 illustrates an example energy offset management system 500, according to some embodiments. The energy offset management system 500 may include a controller 502 that communicates with a renewable source of energy and BESS 504 as an add-on to a legacy infrastructure 506 of a renewable energy facility. The legacy infrastructure 506 may include a BESS meter 508, a BESS 510, a controller 512 controlling the BESS 510, and devices 514. A point of interconnection (POI) meter 516 may read how much energy travels to and from an energy grid. The controller 502 may measure the energy that travels to and from the energy grid by reading a value generated by the BESS meter 508.

The controller 502 may control the renewable source of energy and BESS 504 to power the devices 514 in combination with the BESS 510. In doing so, the controller 502 may provide energy to the devices 514 that the BESS 510 may lose naturally, such as parasitic losses. In some embodiments, to reduce the cost or size requirements of the added controller 502 and renewable source of energy and BESS 504, the BESS of the renewable source of energy and BESS 504 may be smaller than the BESS 510 (e.g., about 2-3% the size of the BESS 510). The controller 502 may determine when the BESS 510 is not charging or discharging energy to the energy grid based on the measured value from the BESS meter (e.g., by determining the measured value exceeds a threshold). The controller 502 may then identify the value as the amount of energy the devices 514 need to operate (e.g., the amount of energy the devices 514 are currently pulling from the energy grid). The controller 502 may control (e.g., discharge or direct energy from) the renewable source of energy and BESS 504 to provide the amount of energy to the devices 514.

In some embodiments, instead of or in addition to powering the devices 514, the controller 502 may communicate with the controller 512 to charge the BESS 510. To do so, the controller 502 may establish a communication session with the controller 512 controlling the switches to control the charge and/or discharge of the BESS 510. The controller 512 may transmit a current state of charge and a maximum charge of the BESS 510 and/or a request for a defined amount of energy to the controller 502. The controller 502 may receive the request, determine an amount of energy to send the BESS 510 (e.g., subtract the current state of charge from the maximum charge or identify the requested amount of energy), and discharge the determined amount of energy from the renewable source of energy and BESS 504 to the BESS 510. The controller 502 may in turn enable the BESS 510 to receive the energy, such as by activating the switches to the charge ports of the BESS 510. In this way, the add-on controller 502 and renewable source of energy and BESS 504 may enable the BESS 510 to remain fully charged, despite any parasitic losses that may naturally occur.

In some embodiments, instead of or in addition to using the BESS meter 508 to determine an amount of energy to discharge from the renewable source of energy and BESS 504, the controller 512 may monitor a meter 513. The meter 513 may be or include an energy meter configured to measure energy flow to the devices 514. The controller 512 may store a power or energy rating for the devices 514 indicating an amount or range of energy or power the devices 514 require to be powered. The controller 512 can measure the amount of power or energy being provided to the devices 514 over time to be measured values from the meter 513. The controller 512 can control charge or discharge of energy from the renewable source of energy and BESS 504 based on such measurements, for example, by comparing the measured amounts of energy with the stored amount or range of energy or power. Responsive to determining a measured value is below the range, the controller 512 can control the renewable source of energy and BESS 504 to discharge energy or power to the devices 514, such as by causing the renewable source of energy and BESS 504 to discharge energy and/or controlling a switch 515 between the renewable source of energy and BESS 504 and the devices 514 to power the devices, in some cases equal to the amount of energy or power required to cause the meter 513 to measure a value at or within the defined amount or range. The controller 512 can stop the renewable source of energy and BESS 504 is discharging energy to the devices 514 responsive to the meter 513 measuring a value above or within the defined amount or range, such as to avoid sending energy to the energy grid when the devices 514 stop drawing power. A meter similar to the meter 513 may similarly be used in any of the embodiments described herein.

Figure 6:
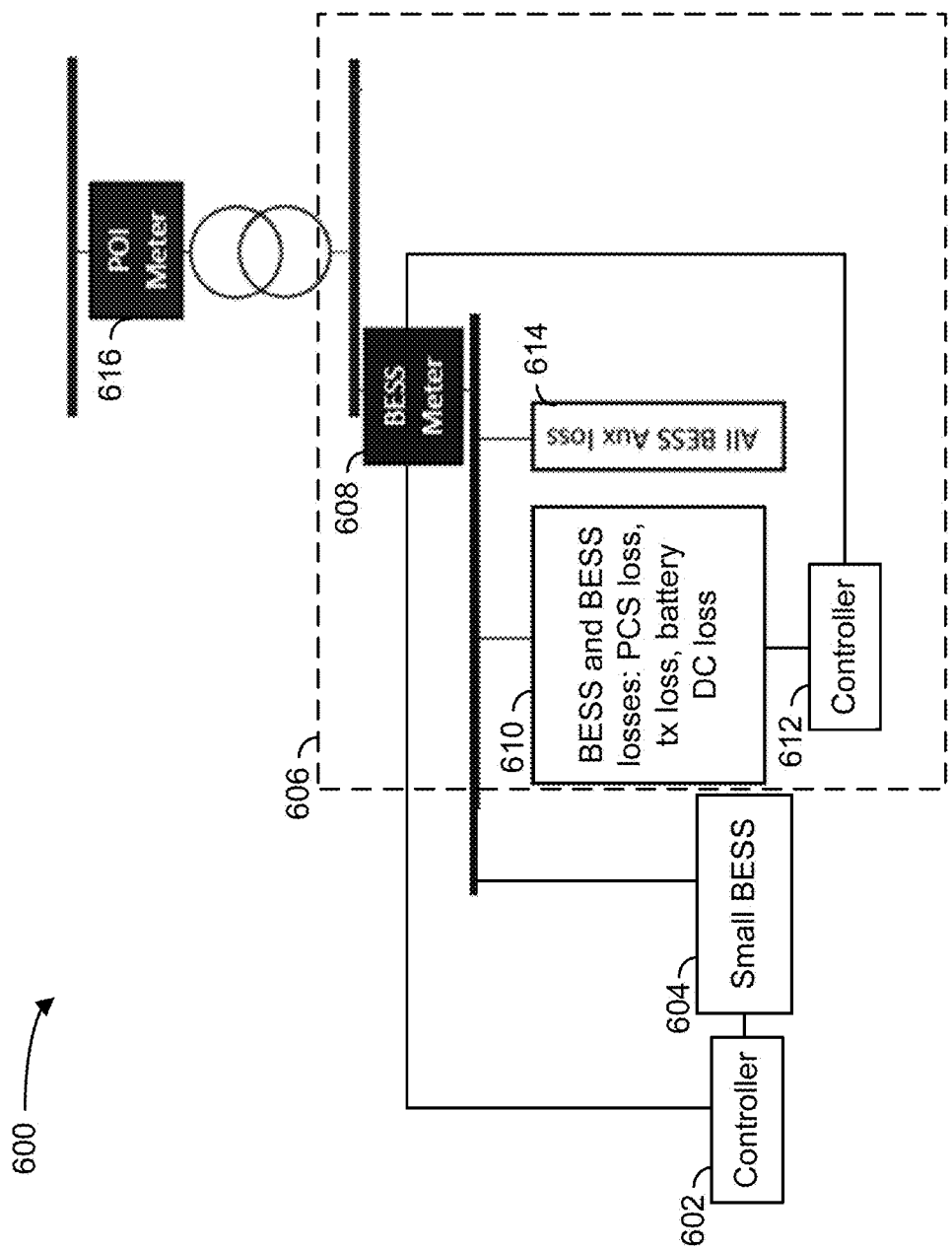
FIG. 6 illustrates another example system including an energy offset management system connected to a renewable energy facility, according to some embodiments.

FIG. 6 illustrates another example energy offset management system 600, according to some embodiments. The energy offset management system 600 may include a controller 602 that communicates with a BESS 604 as an add-on to a legacy infrastructure 606 of a renewable energy facility. The legacy infrastructure 606 may include a BESS meter 608, a BESS 610, a controller 612 controlling the BESS 610, and devices 614. A point of interconnection (POI) meter 616 may read how much energy travels to and from an energy grid. The controller 602 may measure the energy that travels to and from the energy grid by reading a value generated by the BESS meter 608. The components of the energy offset management system 600 may be similar to or the same as the components of the energy offset management system 500, shown and described with reference to FIG. 5.

The controller 602 may control the BESS 604 to power the devices 614 in combination with the BESS 610. In doing so, the controller 602 may provide energy to the devices 614 that the BESS 610 may lose naturally, such as parasitic losses. The controller 602 may do so operating similar to the controller 502, described above, by determining the amount of energy the devices 614 need to operate and sending the determined amount to the devices 614 from the BESS 604. Operation of the energy offset management system 600 may require minimal or no communication with the controller operating to control charging and discharging of the BESS 610.

Figure 7:
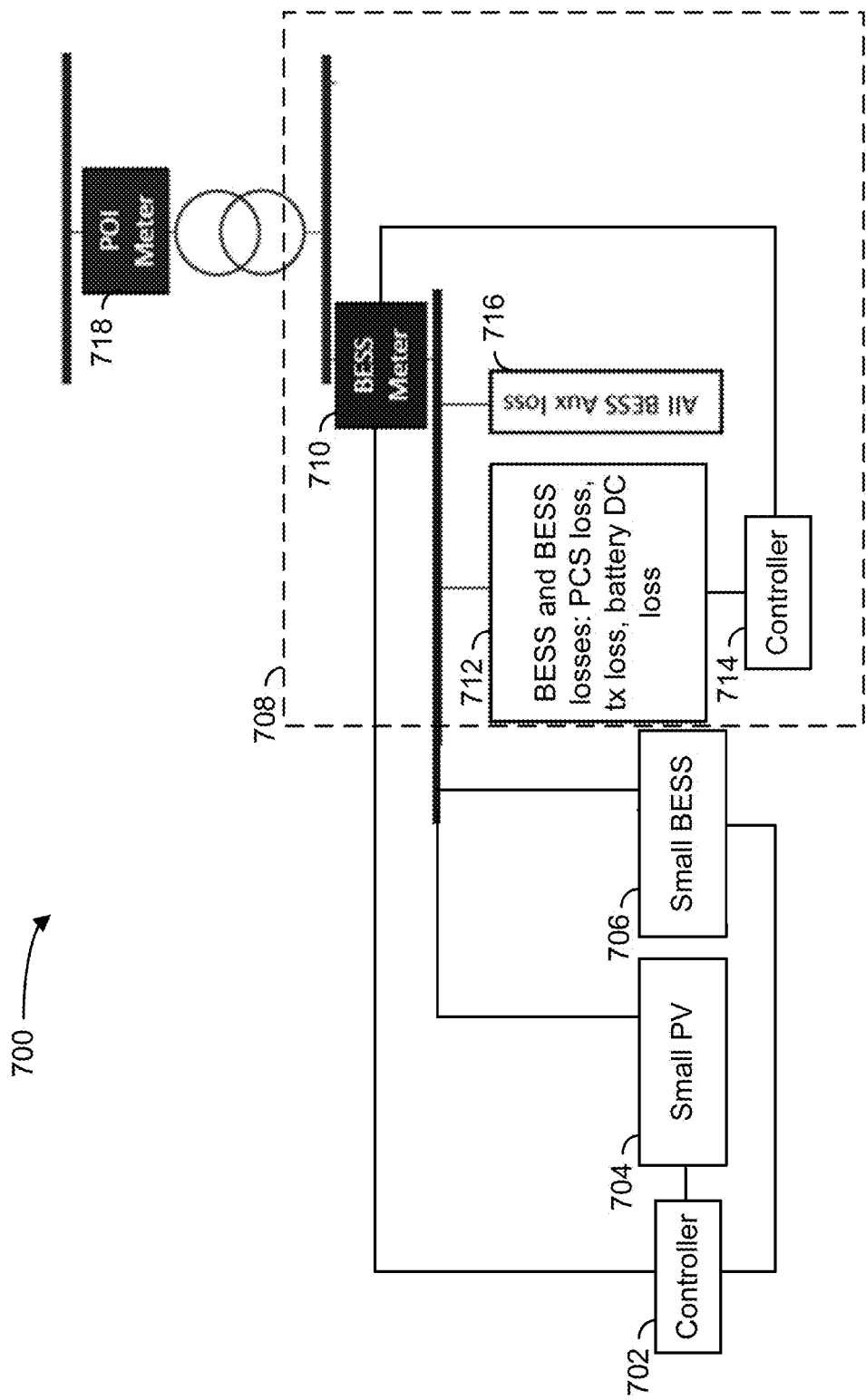
FIG. 7 illustrates another example system including an energy offset management system connected to a renewable energy facility, according to some embodiments.

FIG. 7 illustrates another example energy offset management system 700, according to some embodiments. The energy offset management system 700 may include a controller 702 that communicates with a BESS 706 and an RES 704 as an add-on to a legacy infrastructure 708 of a renewable energy facility. The legacy infrastructure 708 may include a BESS meter 710, a BESS 712, a controller 714 controlling the BESS 712, and devices 716. A point of interconnection (POI) meter 718 may read how much energy travels to and from an energy grid. The controller 702 may measure the energy that travels to and from the energy grid by reading a value generated by the BESS meter 710. The components of the energy offset management system 700 may be similar to or the same as the components of the energy offset management system 500, shown and described with reference to FIG. 5.

The controller 702 may direct energy from the BESS 706 and the RES 704 to the devices 716 without communicating with the controller 714 using the systems and methods described herein. The controller 702 may direct energy from the RES 704 and the BESS 706 individually or together (e.g., cause the RES 704 and the BESS 706 to discharge energy to the devices 716 one at a time or concurrently). The controller 702 can do so by changing the states of switches directing energy from the RES 704 and the BESS 706 using control signals. In doing so, the combination of the controller 702, the BESS 706, and the RES 704 may operate as an add-on that an operator can connect to the legacy infrastructure 708 without ensuring the components are compatible with each other (e.g., without ensuring the controller 702 can communicate with the controller 714). Instead, the controller 702, the BESS 706, and the RES 704 may offset any natural (e.g., parasitic) losses that occur at the BESS 712 communicating only with the BESS meter 710 and by generating and/or storing energy locally.

Figure 8A:
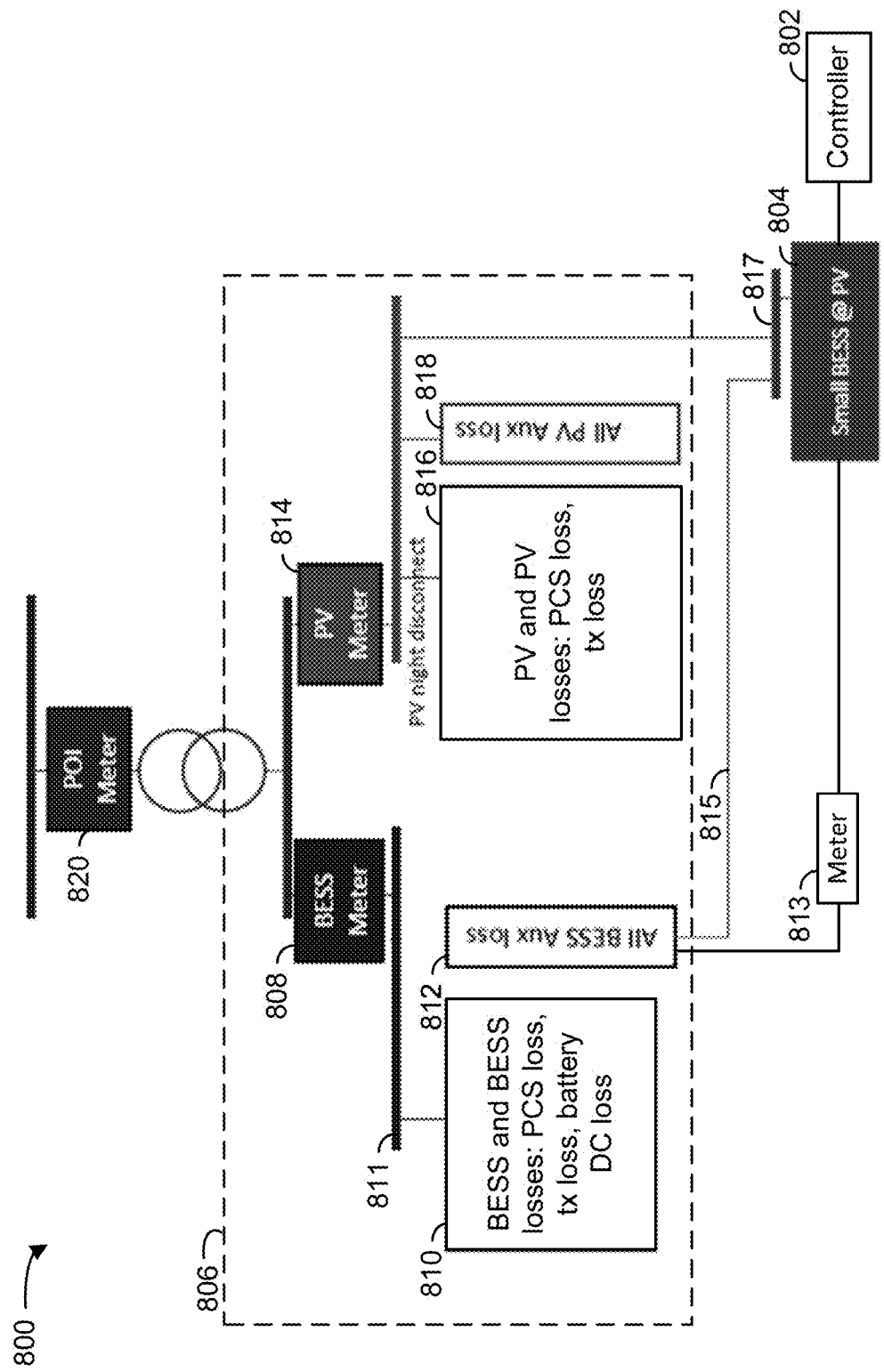
FIG. 8A illustrates an example device powering system, according to some embodiments.

FIG. 8A illustrates an example device powering system 800, according to some embodiments. The device powering system 800 may include a controller 802 that communicates with a renewable source of energy and BESS 804 as an add-on to a legacy infrastructure 806 of a renewable energy facility. The legacy infrastructure 806 may include a BESS meter 808, a BESS 810, devices 812, a photovoltaic (PV) meter 814, a PV energy source 816, and/or PV devices 818. A point of interconnection (POI) meter 820 may read how much energy travels to and from an energy grid. As described herein, a PV energy source can be or include any type of renewable energy source, such as a wind energy source, a photovoltaic energy source, hydropower, etc. The controller 802 may measure the energy requirements of the devices 812 by communicating with the devices 812 and/or by reading a meter 813 connected to the devices 812 that indicates the real-time energy requirements of the devices 812. Components of the device powering system 800 may be similar to or the same as corresponding components of the energy offset management system 500, shown and described with reference to FIG. 5.

The controller 802 may control the renewable source of energy and BESS 804 to power the devices 812 instead of the BESS 810. The controller 802 may do so, for example, after the devices 812 are disconnected (e.g., after a user disconnects the devices 812) from a bus 811 electrically connecting the devices 812 with the BESS 810 and/or the BESS meter 808. The controller 802 may do so by measuring the energy requirements of the devices 812 either by receiving the requirements from the devices 812 themselves or by reading the energy requirements from the meter 813 measuring the energy requirements. In some cases, the energy requirements may be stored in memory of the controller 802. The controller 802 may read the energy requirements and then direct energy from the renewable source of energy and BESS 804 that is equal to the read requirements. In some cases, the controller 802 may determine there is not enough energy available from the renewable source of energy and BESS 804. In such cases, the controller 802 may communicate with a controller controlling the PV energy source 816 requesting the remaining needed energy. The controller 802 may retrieve the energy and then direct the retrieved energy to the devices 812, such as over a power line 815. In some cases, the controller controlling the PV energy source 816 may respond to the controller 802 indicating there is not any or enough energy available. In such cases, the controller 802 may direct the energy that is available from the PV energy source 816 to the devices 812 through a bus 817 and the power line 815 and/or request the remaining energy that is needed to satisfy the energy requirements of the devices 812 from a computer operating the energy grid. The controller 802 may retrieve the remaining energy from the energy grid and direct the energy to the devices 812, such as through the bus 817 and the power line 815, to satisfy the energy requirements of the devices 812. In this way, the controller 802 may operate as an add-on to avoid powering devices in a renewable energy facility with energy from a BESS of the facility that is meant to charge or discharge to the energy grid.

The example device powering system 800 has a few technical advantages. For example, by using a secondary BES and/or RES to power the equipment within the renewable energy facility, the legacy BESS (e.g., the BESS that operates to charge and/or discharge energy to the energy grid) may be sized smaller, therefore saving resources and storage area in the facility; or the full energy capacity of the legacy BESS may be used for revenue-generating activities. Another advantage is that even if the new RES and/or secondary BESS are not able to provide power to the devices, energy from other RES's of the facility and/or the energy grid may be called up on to power the devices, enabling the devices to maintain operation. Additionally, the new BESS, RES, and/or controller may be implemented without affecting operation of the BESS, enabling quick set up and configuration of the secondary BESS, RES, and/or controller with little risk to the overall health of the equipment in the facility.

Figure 8B:
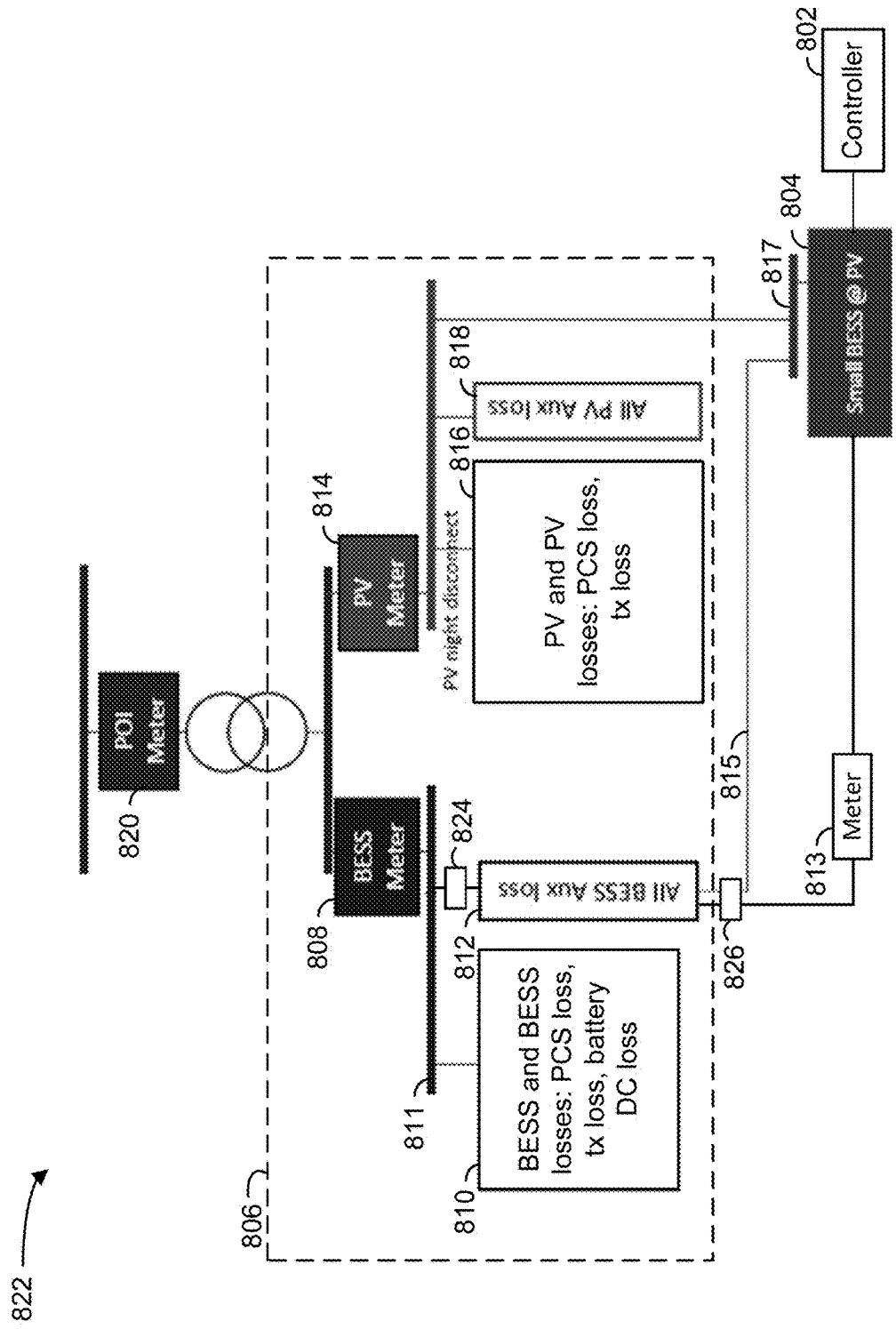
FIG. 8B illustrates an example device powering system, according to some embodiments.

FIG. 8B illustrates an example device powering system 822, according to some embodiments. The device powering system 822 may be similar to the device powering system 800, but include a dual-switch mechanism to vary how the devices 812 are powered. For example, the device powering system 822 may include a first switch 824 and a second switch 826. The controller 802 or another controller may control the state of the first switch 824 and the second switch 826. For example, the controller 802 may control the first switch 824 to be in a first state in which the devices 812 are connected or coupled with the bus 811 or a second state in which the devices 812 are not connected or coupled with the bus 811. The controller 802 may control the second switch 826 to be in a first state in which the devices 812 are connected with the renewable source of energy and BESS 804 and powering the power line 815 and a second state in which the devices 812 are not connected with the renewable source of energy and BESS 804 and the power line 815. The controller 802 may control the first switch 824 and the second switch 826 such as to connect the devices 812 to the bus 811 while disconnecting the connection between the devices 812 from the renewable source of energy and BESS 804 and the power line 815 or connect the renewable source of energy and BESS 804 and the power line 815 while disconnecting the devices 812 from the bus 811. In one position of the switches 824 and 826, the devices 812 can draw energy or power from the energy grid. In the other position, the devices 812 can draw energy or power from the renewable source of energy and BESS 804. Accordingly, the devices 812 may never connect to create a path that can deliver energy from the bus 811 to the renewable source of energy and BESS 804 or vice versa, which can avoid intermingling of energy between renewable and non-renewable energy.

The controller 802 can control the position or states of the switches 824 and 826 based on whether the BESS 810 is charging energy from the grid or discharging energy to the grid or not charging energy from the grid or discharging energy to the grid. For example, the controller 802 may implement the systems and methods described herein to determine whether the BESS 810 is charging energy from the grid or discharging energy to the grid (e.g., based on monitoring values from the BESS meter 808 or based on a state of charge schedule of the BESS 810). Responsive to determining the BESS 810 is charging energy from the grid or discharging energy to the grid, the controller 802 may adjust the position of the switches 824 and 826 to couple with the bus 811 (e.g., to cause the devices 812 to be powered by the BESS 810 and/or the grid) and not be coupled with the renewable source of energy and BESS 804 and the power line 815. Responsive to determining the BESS 810 is not charging energy from the grid or discharging energy to the grid, the controller 802 may adjust the position of the switches 824 and 826 to couple with the renewable source of energy and BESS 804 and the power line 815 and not be coupled with the bus 811 (e.g., to cause the devices 812 to be powered by the renewable source of energy and BESS 804 and the power line 815).

The controller 802 may additionally or instead connect the devices 812 with the renewable source of energy and BESS 804 and the power line 815 responsive to determining the BESS 810 may not have enough energy available to power the devices 812. For example, the controller 802 may determine the BESS 810 does not have enough energy available to power the devices 812 by monitoring the BESS meter 808 or a meter measuring the amount of energy flow to the devices from the bus 811, as described herein. Responsive to determining the BESS 810 does not have enough energy available to power the devices 812, the controller 802 may adjust the position of the switches 824 and 826 to couple with the renewable source of energy and BESS 804 and the power line 815 and not be coupled with the bus 811 (e.g., to cause the devices 812 to be powered by the renewable source of energy and BESS 804 and the power line 815). Thus, the controller 802 may control the switches 824 and 826 to avoid powering the devices 812 from the grid at times in which the BESS 810 is not charging energy from the grid or discharging energy to the grid.

During operation of a renewable energy power plant, energy is provided to an energy grid. In some cases, the energy may come from renewable sources (e.g., RES) while in other cases the energy may come from the BESS charged from the grid or from non-renewable sources (e.g., other energy). However, in some circumstances, e.g., due to various state and federal regulations applicable to generation and wholesale sale of electricity and the operation of investor-owned utilities, renewable energy and other energy cannot intermingle (e.g., must be stored and transferred to and from the grid separately). To satisfy such constraints the renewable energy power plant is configured such that the BESS does not receive or send any energy from or to the RES. However, during times when the BESS is neither charging from the energy grid nor discharging energy to the energy grid, advantages (e.g., reduced utilization of resources, cost, utilizing otherwise wasted power, etc.) exist to utilizing renewable energy to satisfy the operational energy requirements of the renewable energy power plant (e.g., energy to power internal devices, parasitic losses, etc.). To do so, the techniques described herein may introduce a secondary BESS system (e.g., a transferrable BESS (T-BESS) system). The T-BESS system may be selectively coupled to the BESS system or the RES system, but never both at the same time. For example, the T-BESS system may be coupled to the RES system and not the BESS system in a first state. The T-BESS may be coupled to the BESS system and not the RES system in a second state. While in the first state, the RES system may charge the T-BESS system with renewable energy. While in the second state, the T-BESS system may provide energy for the internal devices of the renewable energy power plant and satisfy energy losses (e.g., no load losses (NLLs)) associated with the renewable energy power plant. Because the T-BESS system provides energy to the devices and covers the energy loss of the renewable energy power plant while the BESS is not charging from or discharging energy to the energy grid, the renewable energy and the other energy is kept from intermingling, and the relevant electricity market regulations are followed.

Figure 9A:
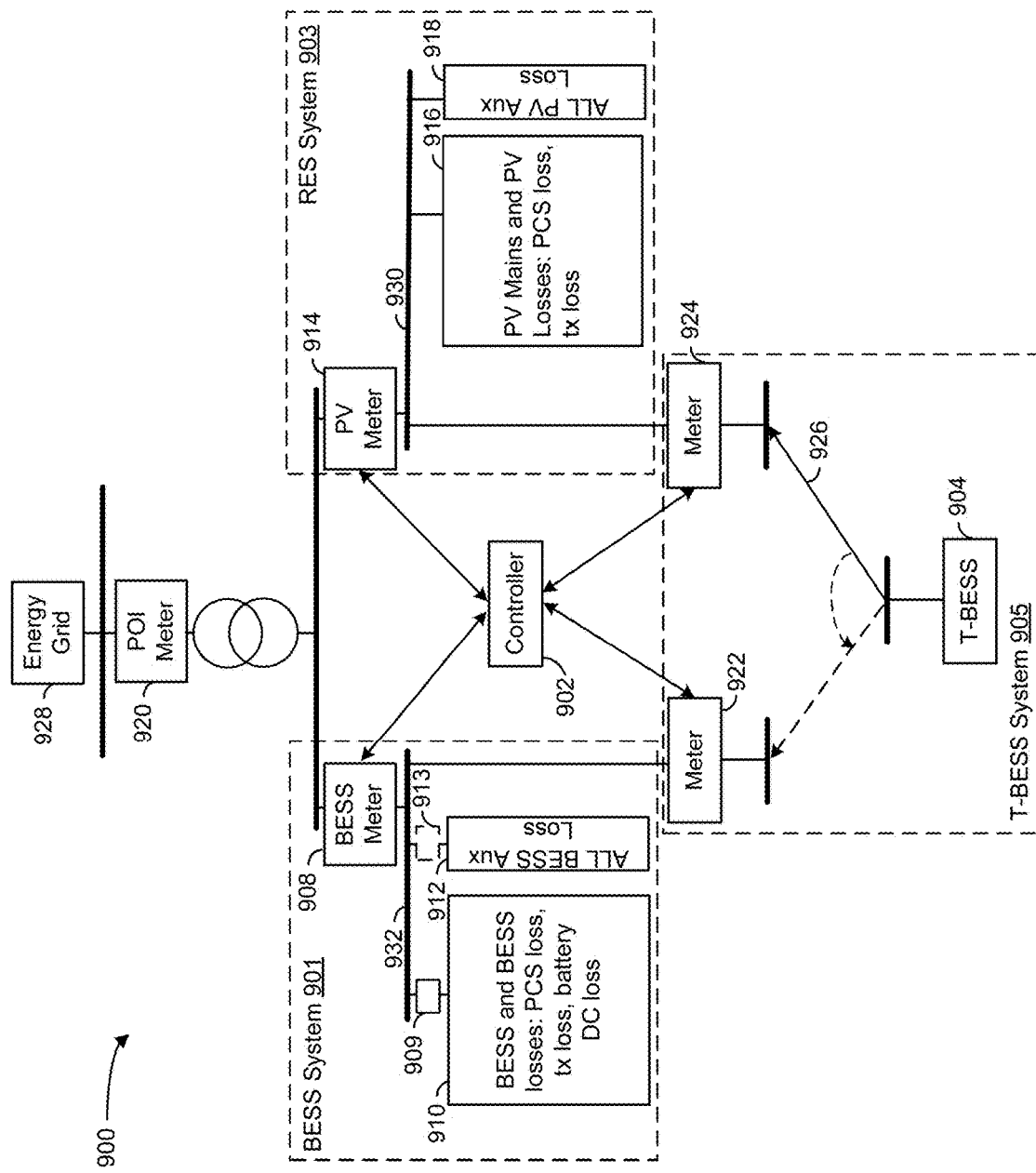
FIG. 9A illustrates an example energy offset management system, according to some embodiments.

FIG. 9A illustrates an example device powering system 900, according to some embodiments. The device powering system 900 may include a controller 902 that communicates with a BESS system 901 of a renewable energy power plant, a renewable energy source (RES) system 903 of the renewable energy power plant, and a second BESS system 905 (e.g., a transferable BESS (T-BESS) system). The BESS system 901 may include a BESS meter 908, a BESS 910, and BESS devices 912. The RES system 903 may include a PV meter 914, a PV energy source 916 (RES 916), and PV devices 918. The second BESS system 905 may include a first meter 922, a second meter 924, a switch 926 (e.g., a transfer switch or a switching system) and a T-BESS 904. A POI meter 920 may read how much energy travels to and from an energy grid 928. The controller 902 may measure the energy requirements of the BESS devices 912 by communicating with the BESS devices 912 and/or by reading a meter connected to the BESS devices 912 that indicates the real-time energy requirements of the BESS devices 912. In some case, the BESS devices 912 can include heating, ventilation, and air conditioning (HVAC) devices. The BESS devices 912 can include one or more devices. In some cases, the BESS system 901 is configured within the renewable energy power plant such that the BESS system 901 does not receive or send any energy from or to the RES system 903. Components of the device powering system 900 may be similar to or the same as corresponding components of the device powering system 800, shown and described with reference to FIG. 8.

In some cases, during operation, there may be times the BESS 910 is not charging with energy from or discharging energy to the energy grid 928 (e.g., when the BESS meter 908 has a non-positive value or non-positive value close to (e.g., within a threshold of) zero). During these times, the BESS system 901 may be in a "standby state" in which the BESS system 901 consumes energy to remain operational (i.e., it experiences no load losses (NLLs)). For example, the BESS devices 912 of the BESS system 901 may consume energy (regardless of active operation), as well as experience other power losses (e.g., power conversion system (PCS) loss, transmission loss, battery DC loss, etc.). However, energy production by the BESS system 901 and the RES system 903 as measured by the meters 908 and 914 may be regulated or restricted such that using the energy to offset such losses may result in various difficulties (e.g., breach of regulatory restrictions, energy unavailability, higher utilization of resources, etc.). The techniques, as disclosed herein, may support powering the BESS devices 912 and balancing the power losses of the BESS system 901 (e.g., during the standby state). For example, the T-BESS 904 may provide energy to the BESS system 901.

In some examples, the RES 916 may power (i.e., send energy to and charge) the T-BESS 904. To do so, the switch 926, coupled with the T-BESS 904, may be selectively coupled (e.g., can be coupled or uncoupled) with the RES 916. The controller 902 may control the switch 926 to be coupled (i.e., physically or electrically connected) with the RES 916. The switch 926, in a first state, may be coupled by default to the RES 916. The RES 916 may provide energy to the T-BESS 904 via the switch 926. For example, a bus 930 electrically connected to the RES 916 may be electrically connected with the meter 924. When the switch 926 is in the first state, the RES 916 can provide energy to the T-BESS 904 via the bus 930 through the meter 924 and the switch 926. The meter 924 may measure energy transferred across the bus 930. In doing so, the meter 924 can measure positive values when energy is traveling from the RES 916 to the T-BESS 904 and negative values when the 924 is traveling from the T-BESS through the meter 924, or vice versa. T-BESS 904 may include one or more energy storage units and charge the one or more energy storage units with the energy provided by the RES 916.

In some cases, the T-BESS 904 may power (e.g., charge or send energy to) the BESS system 901. For example, the BESS system 901 may experience various energy losses (e.g., NLLs or energy required for equipment operation) when the BESS system 901 is not receiving energy from the grid 928 or supplying energy to the grid 928. The controller 902 may control the switch 926 to be coupled with the BESS system 901 (and not coupled with the RES system 903) in a second state. For example, a bus 932 electrically connected to the BESS 910 and the BESS devices 912 may be electrically connected with the meter 922. When the switch 926 is in the second state, the T-BESS 904 may discharge energy across the switch 926, through the meter 922, and to the bus 932 electrically connected to the BESS devices 912. The meter 922 may measure energy transferred from the T-BESS 904 to the bus 932 as a positive value and energy transferred from the bus 932 to the T-BESS 904 as a negative value, or vice versa. The T-BESS 904 may provide energy to the BESS devices 912 to satisfy energy requirements of the BESS system 901.

In some examples, the T-BESS 904 does not supply energy to the BESS 910. For example, the controller 902 (or another controller) may control the BESS system 901 to prevent energy from going to the BESS 910. Alternatively, connection infrastructure 909 (e.g., one or more switches and/or diodes) may stop the energy from going to the BESS 910 to ensure energy from renewable sources is not mixed with other energy.

In some cases, the controller 902 may cause the switch 926 to couple with the BESS system 901 responsive to determining one or more conditions being satisfied. In a first example, the one or more conditions may include the BESS 910 not providing energy to the energy grid 928 nor receiving energy from the energy grid 928. The controller 902 can determine whether the BESS 910 is providing energy to or receiving energy from the energy grid 928 using a few methods. For instance, the controller 902 can store a schedule. The schedule may be stored in memory associated with the controller 902, for example. The schedule may indicate one or more time periods in which the BESS 910 will not provide energy to the energy grid 928 nor receive energy from the energy grid 928. The controller 902 can maintain an internal clock and/or calendar and monitor (e.g., measure or identify at set time intervals) the clock and/or calendar. The controller 902 can compare measured or identified times and/or dates from the internal clock and/or calendar with the schedule. The controller 902 can determine a condition is satisfied responsive to the comparison indicating the current time and/or date corresponds to a time period in which the BESS 910 is sending energy to the energy grid 928 or receiving energy from the energy grid 928.

In another example, the controller 902 can determine whether the BESS 910 is providing energy to or receiving energy from the energy grid 928 by monitoring or measuring values of the BESS meter 908. The controller 902 can compare the measured values to a defined range in memory. The controller 902 may determine the defined range from one or more values stored in the memory. The range may be a zero value (e.g., approximately zero), be between two bounds (e.g., bounds that include a zero value), and/or be all or a subset of negative values. The controller 902 can measure the BESS meter 908 over time. The controller 902 can determine if the BESS meter 908 measures a value within the defined range. If the BESS meter 908 measures a zero value or is within the defined range, the BESS system 901 may not be charging from or discharging energy to the energy grid 928. Responsive to determining the BESS meter 908 measures a value within the defined range, the controller 902 can determine the condition is satisfied and the BESS 910 is neither providing energy to the energy grid 928 nor receiving energy from the energy grid 928.

In some cases, the conditions may include the measured value of the BESS meter 908 being within the defined range for a defined time period. For example, the defined time period may be a quantity of seconds, minutes, or hours that the BESS 910 is neither providing energy to the energy grid 928 nor receiving energy from the energy grid 928. The controller 902 can determine a measured value is within the defined range and continue to poll or measure the BESS meter 908. The controller 902 can receive the measurements and compare each measurement to the defined range. Responsive to determining each value is within the defined range, the controller 902 can determine the condition is satisfied and the BESS 910 is neither providing energy to the energy grid 928 nor receiving energy from the energy grid 928.

The controller 902 can change or adjust the state of the switch 926 responsive to determining at least one of the one or more conditions is satisfied. For example, the controller 902 can determine the BESS 910 is not receiving energy from or providing energy to the energy grid 928 based on one or more measured values and/or a schedule. Responsive to the determination, the controller 902 can transmit a signal to the switch 926 to change or adjust the state of the switch 926 from the first state in which the switch 926 is coupled with the RES system 903 and not the BESS system 901 to the second state in which the switch 926 is coupled with the BESS system 901 and not the RES system 903. In some embodiments, the controller 902 can additionally or instead transmit a control signal to the T-BESS 904 to cause the T-BESS 904 to discharge energy to the BESS system 901 through the switch 926 (e.g., in response to adjusting the state of the switch 926 from the first state to the second state).

In some embodiments, the controller 902 can adjust the state of the switch 926 responsive to determining both the BESS 910 is not providing energy to or receiving energy from the energy grid 928 and determining the BESS devices 912 are consuming energy from the energy grid 928. For example, the controller 902 can monitor the value of the energy meter 908. Responsive to determining both that the BESS 910 is not providing energy to or receiving energy from the grid 928 and that the energy meter 908 is measuring a negative value (e.g., a value within a defined threshold), the controller 902 can adjust the state of the switch 926 from the first state to the second state.

In some examples, the controller 902 may determine an amount of energy to satisfy the energy requirements of the BESS system 901. For example, the determination may be based on a negative value measured from the meter 908. The controller 902 may control (e.g., discharge or direct energy from) the T-BESS 904 to provide the amount of energy (e.g., an amount of energy equal to the absolute value of the measured negative amount of energy) to the BESS system 901 (e.g., to the BESS devices 912). In some cases, the controller 902 may send a message to or control the T-BESS system 905 to discharge the amount of energy to the BESS devices 912, which can cause the energy meter 908 to measure a value of zero (e.g., approximately zero). The controller 902 may continuously measure the energy meter 908 and control the discharge of the T-BESS 904 such that the energy meter 908 measures a value of zero.

In some cases, the controller 902 may control the switch 926 to couple with the RES system 903 (e.g., and not the BESS system 901) (e.g., from the second state to the first state) responsive to one or more second conditions being satisfied. For example, the controller 902 may maintain the switch 926 being coupled with the BESS system 901 while providing energy to the BESS system 901. The controller 902 may determine a measurement of the BESS meter 908 to be at a zero value while the T-BESS 904 is providing energy (e.g., therefore providing energy at a rate equal to a rate of the BESS system 901 consuming energy). In a first example, the second conditions may include the BESS 910 providing energy to the energy grid 928 or receiving energy from the energy grid 928. For example, if the controller 902 determines the measurement of the BESS meter 908 satisfies or exceeds a threshold (e.g., is a positive value), then the controller 902 may determine the BESS system 901 is beginning to provide energy to the energy grid 928 and control the switch 926 to decouple from the BESS system 901 and couple with the RES system 903 (i.e., adjust the switch 926 from the second state to the first state). In a second example, the second conditions may include the T-BESS 904 running low or out of energy. For example, the T-BESS 904 may send an indication of energy levels to the controller 902. The controller 902 may determine to charge the T-BESS 904 by controlling the switch 926 to adjust the state of the switch 926 from the second state to the first state to couple with the RES system 903 to charge the T-BESS 904. In a third example, the controller 902 may determine a measurement of the meter 922 is within a defined range (e.g., is a zero value or is a negative value) indicating the T-BESS is not supplying energy to the BESS system 901. The RES system 903 may adjust the state of the switch 926 from the second state to the first state to initiate charging the T-BESS 904 responsive to the controller 902 controlling the switch 926 to couple with the RES system 903. In some cases, the RES system 903 may charge the T-BESS 904 via energy otherwise wasted (e.g., clipped PV energy of the RES 916).

While the given examples use positive, negative, and zero values to indicate a flow of energy to and from the various systems, it is to be understood that any value may indicate the flow in a similar manner and the provided measurements should be construed as examples. The various examples may be a single example or multiple examples of operations in accordance with the present disclosure.

In some cases, the controller 902 may store (e.g., in memory associated with the controller 902) measurements of the meters 908, 914, 922, and 924. For example, the measurements may support verification of compliance with various regulatory requirements for providing energy to and from BESS and RES systems. For example, a comparison between the measurements associated with the meters 908 and 922 may determine whether energy from the T-BESS 904 was sent to the energy grid 928 (e.g., by determining if the T-BESS 904 provided more energy than consumed by the BESS system 901).

In some embodiments, the T-BESS system 905 may be an add-on system. For example, the T-BESS system 905 may be a system separate from the renewable energy power plant. The T-BESS system 905 may be installed to (e.g., connected with, coupled with) the renewable energy power plant. In some cases, the T-BESS system 905 may be removed and installed as needed between multiple renewable energy power plants. In some cases, the T-BESS system 905 may include the controller 902. In some cases, software and/or firmware associated with the operations as described herein may be installed to the controller 902 as part of the installation process of the T-BESS system 905.

In some embodiments, instead of or in addition to using the BESS meter 908 to determine an amount of energy to discharge from the T-BESS 904, the controller 902 may monitor a meter 913. The meter 913 may be or include an energy meter configured to measure energy flow to the BESS devices 912. The controller 902 may store a power or energy rating for the BESS devices 912 indicating an amount or range of energy or power the BESS devices 912 require to be powered. The controller 902 can measure the amount of power or energy being provided to the BESS devices 912 over time to be measured values from the meter 913. The controller 902 can control the state of the switch 926 based on such measurements, for example, by comparing the measured amounts of energy with the stored amount or range of energy or power. Responsive to determining a measured value is below the range, the controller 902 can control the switch to be in the second state and/or discharge energy from the T-BESS 904 across the meter 922 to power the devices, in some cases equal to the amount of energy or power required to cause the meter 913 to measure a value at or within the defined amount or range. The controller 902 can adjust or change the state of the switch 926 from the second state to the first state responsive to the meter 913 measuring a value above or within the defined amount or range, such as to avoid sending energy to the energy grid 928 when the BESS devices 912 stop drawing power.

As described herein, although the BESS Aux losses are described as BESS devices (e.g., the BESS devices 912) that are measurable and may be separately fed, plant no load losses may include all of the loads consumed by the plant when the plant is not participating in the market or is idling. Idling can be defined as when a legacy subsystem meter (e.g., the BESS meter 908 or the PV meter 914) is measuring zero or a small quantity that is less than a pre-defined threshold, for example. The T-BESS (e.g., the T-BESS 904) can be used to offset those losses. No load losses can include transformer parasitic losses, PCS parasitic losses, and the auxiliary losses, (e.g., the controls and the thermal management losses (cooling/heating), safety systems losses, etc.). The auxiliary loads may or may not be separately fed. In some cases, energy to feed the auxiliary loads can be pulled from the main power flow path. In general, a controller can rely on a BESS meter, such as for the BESS NLL case, to determine the total NLL losses. The controller can operate to offset the total NLL by reading the BESS meter and setting the BESS meter to zero (or another defined value) responsive to determining that a BESS (or another asset) configured to account for the NLL is idling.

Figure 9B:
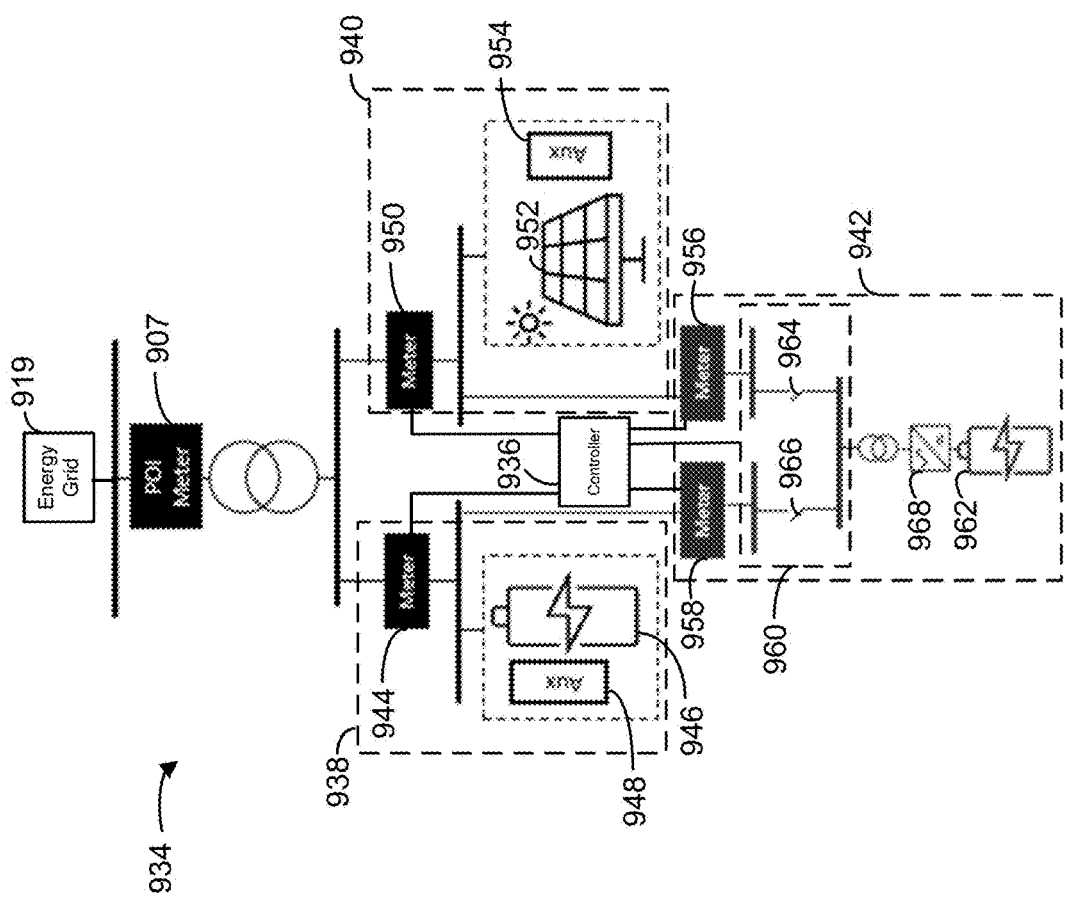
FIG. 9B illustrates an example energy offset management system, according to some embodiments.

FIG. 9B illustrates an example device powering system 934, according to some embodiments. The device powering system 934 may include a controller 936 that communicates with a first BESS system 938 of a renewable energy power plant, a renewable energy source (RES) system 940 of the renewable energy power plant, and a second BESS system 942. The first BESS system 938 may include a BESS meter 944, a first BESS 946, and BESS devices 948. The RES system 940 may include a PV meter 950, a PV energy source 952 (RES 952), and PV devices 954. The second BESS system 942 may include a first meter 956, a second meter 958, a switching system 960, a second BESS 962, and an inverter 968. The inverter 968 can be any power flow device, as described below. A POI meter 907 may read how much energy travels to and from an energy grid 919. The controller 936 may measure the energy requirements of the BESS devices 948 by communicating with the BESS devices 948 and/or by reading a meter (e.g., the BESS meter 944) connected to the BESS devices 948 that indicates the real-time energy requirements of the BESS devices 948. The BESS devices 948 can include one or more devices. In some cases, the BESS system 938 is configured within the renewable energy power plant such that the BESS system 938 does not receive or send any energy from or to the RES system 940. Components of the device powering system 934 may be similar to or the same as corresponding components of the device powering system 900, shown and described with reference to FIG. 9A.

The switching system 960 can be configured to selectively connect the second BESS 962 (or the second BESS system 942) with the first BESS system 938 and/or the RES system 940. For example, the switching system 960 can include a first switch 964 and a second switch 966. The switching system 960 can include any number of switches. The switching system 960 can be configured to operate in a first state and a second state. In the first state, the first switch 964 can be closed and the second switch 966 can be open. The first state can enable the RES system 940 to supply or direct power to the second BESS 962 to charge the second BESS 962. Because the second switch 966 can be open in the first state, the second BESS 962 may not be able to discharge or supply any power to the first BESS system 938. Advantageously, in the first state, because the second switch 966 can be open, there may not be a direct connection between the RES system 940 and the first BESS system 938. In some embodiments, in the first state, the controller 936 may transmit a control signal to the second BESS 962 to enable charging of the second BESS 962.

In the second state, the first switch 964 can be open and the second switch 966 can be closed. The second state can enable the second BESS system 942 to supply, discharge, or direct power to the BESS devices 948 to power (e.g., through the closed second switch 966) the BESS devices 948. Because the first switch 964 can be open in the second state, the RES system 940 may not charge the second BESS 962 when the switching system 960 is in the second state. Advantageously, in the second state, because the first switch 964 can be open, there may not be a direct connection between the RES system 940 and the first BESS system 938. In some embodiments, in the second state, the controller 936 may transmit a control signal to the second BESS 962 to enable or cause discharging of the second BESS 962.

The controller 936 can control the state of the switching system 960 similar to how the controller 902 controls the state of the switch 926. For instance, the controller 936 can transmit control signals to the switching system 960 to change the state of the switching system 960 or change the states of the individual switches 964 and 966. The controller 936 can do so based on a current state of the first BESS 946 and/or an energy reading of the BESS meter 944. For example, the controller 936 can determine the first BESS 946 is not charging with energy from the energy grid 919 or discharging energy to the energy grid 919. The controller 936 can monitor the BESS meter 944 or another energy meter measuring the energy requirements of the BESS devices 948. Based on the monitoring the BESS meter 944 or another energy meter and/or responsive to determining the first BESS 946 is not charging with energy from the energy grid 919 or discharging energy to the energy grid 919, the controller 936 can determine to provide energy from the second BESS 962 to the BESS devices 948. Based on the determination, the controller 936 can transmit a control signal to the switching system 960. The control signal can cause the switching system 960 to change from the first state to the second state (e.g., cause the first switch 964 to open and disconnect the second BESS 962 from the RES system 940 and the second switch 966 to close and connect the second BESS 962 with the first BESS system 938). In some cases, the controller 936 can transmit a control signal to the second BESS 962 to cause the second BESS 962 to discharge energy through the second switch 966 to power the BESS devices 948. In some cases, the controller 936 can transmit a control signal to the inverter 968 to activate the inverter 968 and/or otherwise enable energy to flow from the second BESS 962 to power the BESS devices 948.

In some embodiments, the controller 936 can control the inverter 968 based on measurements from the BESS meter 944. For example, when the switching system 960 is in the second state, the controller 936 can monitor the BESS meter 944 for values that indicate the amount of energy that is flowing from the energy grid 919 through the BESS meter 944. The controller 936 can control the inverter 968 based on such values, for example, by adjusting the power setpoint (e.g., up to the maximum or rated capacity of the inverter 968) of the inverter 968 to match the measured values. The controller 936 can similarly control the inverter 968 based on measurements at the BESS devices 948 that indicate the energy requirements of the BESS devices 948. Such control can cause the BESS meter 944 to measure a value of zero. Accordingly, the controller 936 can discharge the second BESS 962 to power the BESS devices 948 while avoiding sending energy to the energy grid 919.

The controller 936 can monitor the BESS meter 944 or another meter measuring the power requirements of the BESS devices 948 while the second BESS 962 discharges energy to the BESS devices 948. The controller 936 can adjust or change the state of the switching system 960 from the second state to the first state responsive to determining the BESS meter 944 is within a defined range (e.g., a value above zero) or the meter measuring the energy requirements of the BESS devices 948 indicates the second BESS 962 is supplying more energy than required by the BESS devices 948. The controller 936 can adjust or change the state of the switching system 960 by transmitting a control signal to the switching system 960 and/or the switches 964 or 966 of the switching system 960 that causes the first switch 964 to close and connect the second BESS 962 with the RES system 940 and the second switch 966 to open and disconnect the second BESS 962 from the first BESS system 938. In some cases, the controller 936 can transmit a control signal to the inverter 968 to cause the inverter 968 to stop allowing energy discharge from the second BESS 962. The controller 936 can otherwise operate or control the state of the switching system 960 in the same or a similar manner to the manner in which the controller 902 is described as controlling the switch 926 with reference to FIG. 9A.

The controller 936 can control energy flowing from the second BESS 962 to the PV devices 954 in a similar manner to how the controller 936 controls energy flowing from the second BESS 962 to the BESS devices 948. For example, the controller 936 can discharge energy from the second BESS 962 to the PV devices 954 upon determining the RES 952 are not able to sufficiently power the PV devices 954 (e.g., based on a negative reading of the PV meter 950 or a negative reading of the PV meter 950 for at least a defined time period) or the current time is within a defined time period (e.g., at night or at a time when the sun is not out or is blocked by the clouds), such as a time in which the RES 952 do not generate energy (e.g., do not generate enough energy or generate an amount of energy below a threshold) to power the PV devices 954. Upon making such a determination, the controller 936 can control or adjust the state of the switching system 960 to be in the first state in which the switch 964 is closed (and the switch 966 is open). In some cases, the controller 936 can set the power setpoint of the inverter 968 to be at a defined value (e.g., a defined value equal to a measurement of the PV meter 950) up to a maximum capacity of the inverter 968. Accordingly, the controller 936 can enable the second BESS 962 to operate as a back-up power supply for the PV devices 954.

The controller 936 can control the discharge of the second BESS 962 based on measurements from the meters 950 and 956. For example, the controller can monitor the readings of the PV meter 950. Upon determining the PV meter 950 has a reading below zero (e.g., the energy grid 919 is providing energy through the PV meter 950), the controller 936 can adjust the state of the switching system 960 to close the switch 964 (e.g., cause the switching system 960 be in the first state) to discharge energy from the second BESS 962 to the PV devices 954. The controller 936 can control the inverter 968 to have a power setpoint equal to the PV meter 950 over time to cause the PV meter 950 to have a reading of zero while the second BESS 962 powers the PV devices 954. In another example, the controller 936 can measure a meter measuring the energy requirements of the PV devices 954 and control the inverter 968 to have a power setpoint equal to such a meter.

Figure 9C:
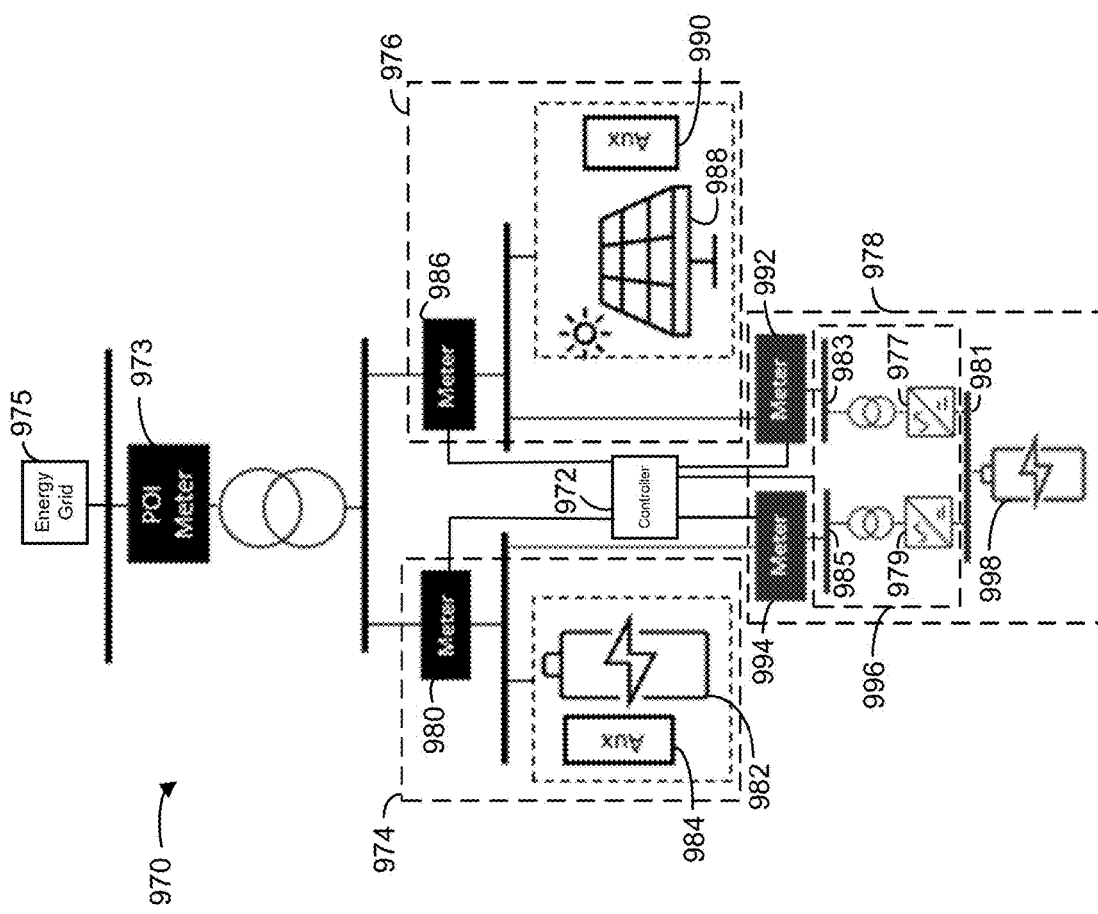
FIG. 9C illustrates an example energy offset management system, according to some embodiments.

FIG. 9C illustrates an example device powering system 970, according to some embodiments. The device powering system 970 may include a controller 972 that communicates with a first BESS system 974 of a renewable energy power plant, a renewable energy source (RES) system 976 of the renewable energy power plant, and a second BESS system 978. The first BESS system 974 may include a BESS meter 980, a first BESS 982, and BESS devices 984. The RES system 976 may include a PV meter 986, a PV energy source 988 (RES 988), and PV devices 990. The second BESS system 978 may include a first meter 992, a second meter 994, a switching system 996, and a second BESS 998. A POI meter 973 may read how much energy travels to and from an energy grid 975. The controller 972 may measure the energy requirements of the BESS devices 984 by communicating with the BESS devices 984 and/or by reading a meter (e.g., the BESS meter 980) connected to the BESS devices 984 that indicates the real-time energy requirements of the BESS devices 984. The BESS devices 984 can include one or more devices. In some cases, the first BESS system 974 is configured within the renewable energy power plant such that the first BESS system 974 does not receive or send any energy from or to the RES system 976. Components of the device powering system 970 may be similar to or the same as corresponding components of the device powering system 900, shown and described with reference to FIG. 9A, and/or corresponding components of the device powering system 934, shown and described with reference to FIG. 9B.

The switching system 996 can be configured to selectively connect the second BESS 998 (or the second BESS system 978) with the first BESS system 974 and/or the RES system 976. For example, the switching system 996 can include a first power flow device 977 and a second power flow device 979. As described herein, a power flow device is a device that controls the flow of power or energy to or from the second BESS 998. Examples of power flow devices can include inverters, AC to AC converters, DC-to-DC converters, etc. In some embodiments, the first power flow device 977 and the second power flow device 979 can share a common DC bus 981. The first power flow device 977 and the second power flow device 979 can be connected to separate AC buses 983 and 985. The first power flow device 977 and the second power flow device 979 can operate as individual switches that allow energy to flow to or from the second BESS 998.

The switching system 960 can be configured to operate in a first state and a second state. In the first state, the first power flow device 977 can be active (e.g., closed or operate at a power setpoint above zero up to a maximum capacity or rating of the first power flow device 977) and the second power flow device 979 can be inactive (e.g., open or operate at a power setpoint of zero). The first state can enable the RES system 976 to supply or direct power (e.g., couple) to the second BESS 998 to charge the second BESS 998. Because the second power flow device 979 can be inactivate in the first state, the second BESS 998 may not be able to discharge or supply any power to the first BESS system 974 (i.e., decouple). Advantageously, in the first state, because the second power flow device 979 can be inactive, there may not be a direct connection between the RES system 976 and the first BESS system 974. In some embodiments, in the first state, the controller 972 may transmit a control signal to the second BESS 998 to enable charging of the second BESS 998. In some embodiments, to further separate the energy generate at the RES system 976 and/or stored at the first BESS system 974, the power flow device 977 may be configured to only pass energy to the second BESS 998 and/or the power flow device 979 may be configured to only pass energy from the second BESS 998.

In the second state, the first power flow device 977 can be inactive (e.g., operate at a power setpoint of zero) and the second power flow device 979 can be active (e.g., closed or operate at a power setpoint above zero up to a maximum capacity or rating of the first power flow device 979). The second state can enable the second BESS system 978 to supply, discharge, or direct power to the BESS devices 984 to power (e.g., through the active second power flow device 979) the BESS devices 984. Because the first power flow device 977 can be inactive in the second state, the RES system 976 may not charge the second BESS 998 when the switching system 996 is in the second state. Advantageously, in the second state, because the first power flow device 977 can be inactive, there may not be a direct connection between the RES system 976 and the first BESS system 974. In some embodiments, in the second state, the controller 972 may transmit a control signal to the second BESS 998 to enable or cause discharging of the second BESS 998.

The controller 972 can control the state of the switching system 996 similar to how the controller 902 controls the state of the switch 926 and/or the controller 936 controls the state of the switching system 960. For instance, the controller 972 can transmit control signals to the switching system 996 to change or adjust the state of the switching system 996 or change the states of the individual power flow devices 977 and 979. The controller 972 can do so based on a current state of the first BESS 982 and/or an energy reading of the BESS meter 980. For example, the controller 972 can determine the first BESS 982 is not charging with energy from the energy grid 975 or discharging energy to the energy grid 975. The controller 972 can monitor the BESS meter 980 or another energy meter measuring the energy requirements of the BESS devices 984. Based on the monitoring the BESS meter 980 or another energy meter and responsive to determining the first BESS 982 is not charging with energy from the energy grid 975 or discharging energy to the energy grid 975, the controller 972 can determine to provide energy from the second BESS 998 to the BESS devices 984. Based on the determination, the controller 972 can transmit a control signal to the switching system 996. The control signal can cause the switching system 996 to change from the first state to the second state (e.g., cause the first power flow device 977 to inactivate and the second power flow device to active). In some cases, the controller 972 can transmit a control signal to the second BESS 998 to cause the second BESS 998 to discharge energy through the second power flow device 979 to power the BESS devices 984.

The controller 972 can monitor the BESS meter 980 or another meter measuring the power requirements of the BESS devices 984 while the second BESS 998 discharges energy to the BESS devices 984. The controller 972 can adjust or change the state of the switching system 996 from the second state to the first state responsive to determining the BESS meter 980 is within a defined range (e.g., a value above zero) or the meter measuring the energy requirements of the BESS devices 984 indicates the second BESS 998 is supplying more energy than required by the BESS devices 984. The controller 972 can adjust or change the state of the switching system 996 by transmitting a control signal to the switching system 996 and/or the power flow devices 977 or 979 of the switching system 996 that causes the first power flow device 977 to activate and the second power flow device 979 to deactivate. The controller 972 can otherwise operate or control the state of the switching system 996 in the same or a similar manner to the manner in which the controller 902 is described as controlling the switch 926 with reference to FIG. 9A.

In some embodiments, and in some cases depending on the regulations of the jurisdiction in which the device powering system 970 is located, the power flow devices 977 and/or 979 can be used to enable energy generated by the RES system 976 to be stored in the second BESS 998 and/or passed through to the first BESS 982 for storage. Similarly, energy stored in the first BESS 982 can be stored in the second BESS 998 and/or passed through to power the PV devices 990. Such energy can be directed by the controller 972 by controlling the state of the switching system 996. The controller 972 can control the switching system 996 to charge the second BESS 998 for a set time period (e.g., during the day) either from discharge of the first BESS 982 or from energy from the PV system 976. The controller 972 can discharge the second BESS 998 and provide power to charge the first BESS 982 and or power the BESS devices 984 or the PV devices 990 for a second time period, such as during the night. The controller 972 can control the switching system 996 to control such discharge and direct the discharged energy. The controller 972 can do so by monitoring meters measuring the energy requirements (e.g., from the meters 980 and/or 986) of the BESS devices 984 and/or the PV devices 990 and adjusting the switching system 996 to enable the second BESS 998 to supply power to meet the energy requirements. Such adjustments can cause the switching system 996 to enter the first state, the second state, or a third state in which the switching system 996 enables from flow of energy from the second BESS 998 through both of the power flow devices 977 and 979. The controller 936 controlling the switching system 960 and/or the controller 902 controlling the switch 926 can similarly control the corresponding switching system 960 and/or switch 926 to power devices within the systems 934 and/or 900, in some embodiments.

The controller 972 can control the power flow device 979 based on readings from the BESS meter 980. For example, after determining the first BESS 982 is not discharging energy to the energy grid 975 or receiving energy from the energy grid 975, the controller 972 can adjust the state of the switching system 996 from the first state to the second state. In the second state, the controller 972 can monitor the meter 980. By doing so, the controller 972 can identify values indicating the amount of energy the energy grid 975 is transferring to the BESS devices 984. The controller 972 can set the power flow device 979 to output an amount of energy from the second BESS 998 at or equal to the identified values (e.g., up to a maximum or power rating of the power flow device 979) identified from the BESS meter 980. The controller 972 can control the power flow device 979 over time in this manner while the switching system 996 is in the second state. The controller 972 can similarly control the power flow device 977 based on readings from the PV meter 986 when using stored energy to power the PV devices 990.

The controller 972 can control energy flowing from the second BESS 998 to the PV devices 990 in a similar manner to how the controller 972 controls energy flowing from the second BESS 998 to the BESS devices 984. For example, the controller 972 can discharge energy from the second BESS 998 to the PV devices 990 upon determining the RES 988 are not able to sufficiently power the PV devices 990 (e.g., based on a negative reading of the PV meter 986 or a negative reading of the PV meter 950 for at least a defined time period) or the current time is within a defined time period (e.g., at night or at a time when the sun is not out or is blocked by the clouds), such as a time period in which the RES 988 do not generate energy (e.g., do not generate enough energy or generate an amount of energy below a threshold) to power the PV devices 990. Upon making such a determination, the controller 972 can control or adjust the state of the switching system 996 to be in the first state in which the power flow device 977 is activated and the power flow device 979 is inactivated. Accordingly, the controller 972 can enable the second BESS 998 to operate as a back-up power supply for the PV devices 990.

The controller 972 can control the discharge of the second BESS 998 based on measurements from the meters 986 and 992. For example, the controller 972 can monitor the readings of the PV meter 986. Upon determining the PV meter 986 has a reading below zero (e.g., the energy grid 975 is providing energy through the PV meter 986), the controller 972 can adjust the state of the switching system 996 to activate the power flow device 977 (e.g., cause the switching system 996 to be in the first state) to discharge energy from the second BESS 998 to the PV devices 990. The controller 972 can control the power flow device 977 to have a power setpoint equal to the PV meter 986 over time to cause the PV meter 986 to have a reading of zero while the second BESS 998 powers the PV devices 990. In another example, the controller 972 can measure a meter measuring the energy requirements of the PV devices 990 and control the power flow device 977 to have a power set point equal to the energy requirements of such a meter.

In some embodiments, any of the BESSs 904, 962, or 998 can be replaced with one or more RES. In such embodiments, the controllers controlling the RES can control the switching systems previously controlling direction of charge or discharge of the BESSs 904, 962, or 998 such that the RES selectively discharges to power respective PV devices or BESS devices (or other no load losses of the respective RES or BESS systems or sub-systems). For example, in the system 900, the controller 902 can control an RES (e.g., a T-RES) in place of the T-BESS 904 to direct energy to the RES system 903 when the switch 926 is in the first state and direct energy to the BESS system 901 when the switch 926 is in the second state. In doing so, the controller 902 can cause the RES to power the PV devices 918 or send energy through the PV meter 914 in the first state and power the BESS devices 912 in the second state. The controller 902 can control the state of the switch 926 using the same or a similar method to the method of controlling the switch 926 when the T-BESS 904 is not replaced by an RES. The controllers 936 and/or 972 can similarly operate to direct energy from an RES replacing the second BESS 962 and/or 998.

Figure 9D:
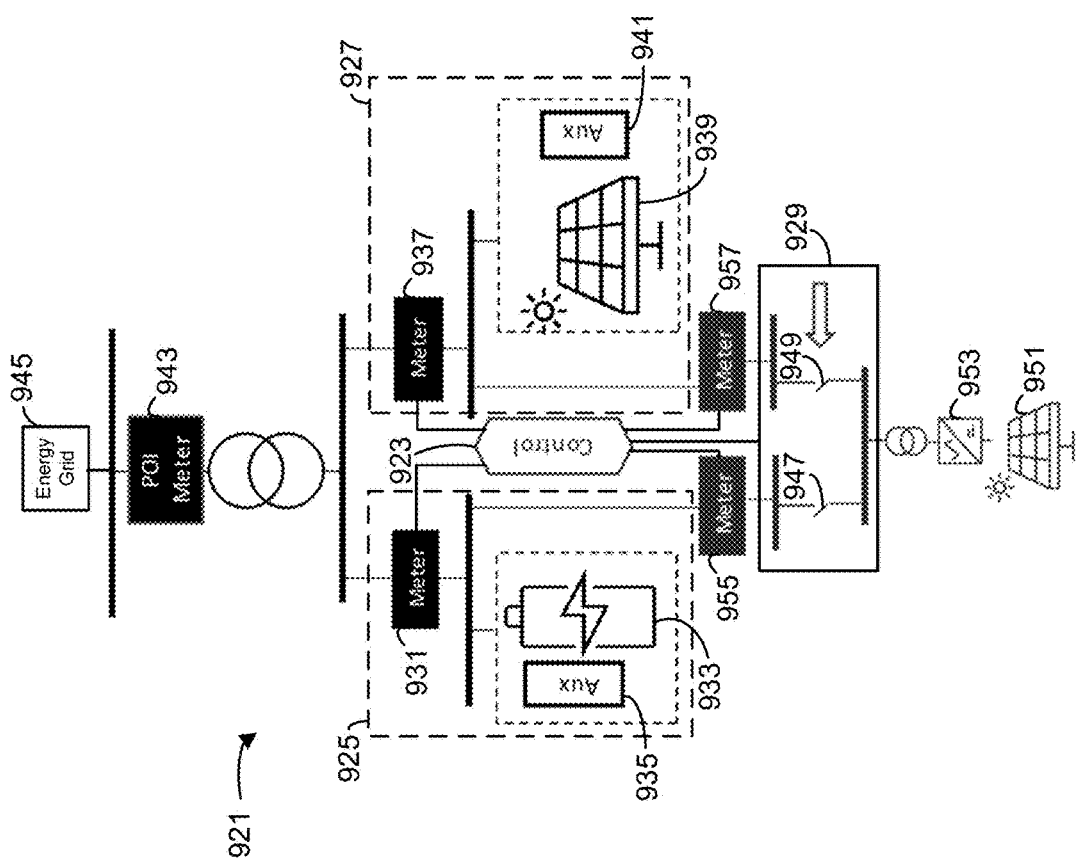
FIG. 9D illustrates an example energy offset management system, according to some embodiments.

For example, FIG. 9D illustrates an example device powering system 921, according to some embodiments. The device powering system 921 may include a controller 923 that communicates with a BESS system 925 of a renewable energy power plant, a renewable energy source (RES) system 927 of the renewable energy power plant, and a switching system 929. The BESS system 925 may include a BESS meter 931, a BESS 933, and BESS devices 935. The RES system 927 may include a PV meter 937, a PV energy source 939 (RES 939), and PV devices 941. A POI meter 943 may read how much energy travels to and from an energy grid 945. The controller 923 may measure the energy requirements of the BESS devices 935 by communicating with the BESS devices 935 and/or by reading a meter (e.g., the BESS meter 931) connected to the BESS devices 935 that indicates the real-time energy requirements of the BESS devices 935. The BESS devices 935 can include one or more devices. Components of the device powering system 970 may be similar to or the same as corresponding components of the device powering system 900, shown and described with reference to FIG. 9A, corresponding components of the device powering system 934, shown and described with reference to FIG. 9B, and/or corresponding components of the device powering system 970, shown and described with reference to FIG. 9C.

The switching system 929 can be configured to selectively connect an RES 951 with the RES system 927 or the BESS system 925. For example, the switching system 929 can include power flow devices or switches 947 and/or 949, as described herein. The power flow devices or switches 947 and/or 949 can operate to restrict energy from flowing between the RES system 927 to the BESS system 925 and enable energy to flow from the RES 951 to the BESS system 925 or the RES system 927. For example, the power flow devices and/or switches 947 and/or 949 can be power flow devices (e.g., inverters) or switches configured to connect or disconnect the RES 951 with the BESS system 925 or the RES system 927.

The RES 951 can be any renewable energy source. For example, the RES 951 can be or include a photovoltaic energy source, a wind energy source, a hydrogen energy source, etc. The RES 951 can generate energy over time and discharge the energy through an inverter or other power flow device 953 and the switching system 929 to power the BESS devices 935 and/or the PV devices 941.

The switching system 929 can be configured to operate in a first state and a second state. In the first state, the power flow device or switch 947 of the switching system 929 can be activated or closed to allow energy to flow from the RES 951 to the BESS system 925. Also, in the first state, the power flow device or switch 949 can be inactivated or open to restrict energy from flowing from the RES 951 to the PV system 927. In the second state, the power flow device or switch 947 may be inactive or open and the power flow device or switch 949 can be active or closed, which may allow energy to flow from the RES 951 to the PV devices 941 but not to the BESS devices 935. These switching configurations of the switching system 929 may enable the RES 951 to supply energy to the BESS devices 935 and/or the PV devices 941 without causing any intermingling between energy generated by the BESS system 925 and the RES system 927.

The controller 923 can control the state of the switching system 929 based on the state of the BESS 933. For example, the controller 923 can operate the switching system 929 similar to how the controller 902 controls the state of the switch 926 and/or the controller 936 controls the state of the switching system 960. For instance, the controller 923 can, over time, determine whether the BESS 933 is discharging energy to the energy grid 945 or charging with energy from the energy grid 945. The controller 923 can do so, for example, based on a schedule or by monitoring the BESS meter 931, as described herein. The controller 923 can determine a state of the switching system 929 based on the determination. For example, responsive to determining the BESS 933 is not discharging energy to the energy grid 945 or charging with energy from the energy grid 945, the controller 923 may set the state of the switching system 929 to be in the first state in which the power flow device or switch 947 is active or closed and the power flow device or switch 949 is inactive or open. This configuration can facilitate the RES 951 providing power to the BESS devices 935 through the power flow device or switch 947 while restricting energy from flowing through the power flow device or switch 949. Responsive to determining the BESS 933 is discharging energy to the energy grid 945 or charging with energy from the energy grid 945, the controller 923 may set the state of the switching system 929 to be in the second state in which the power flow device or switch 949 is active or closed and the power flow device or switch 947 is inactive or open to allow energy to flow through the power flow device or switch 949 to the RES system 927.

In some embodiments, the controller 923 can monitor the BESS meter 931 or the meter 955 to determine the state of the switching system 929. For example, the controller 923 can continuously or periodically retrieve the measurements captured by the BESS meter 931. The controller 923 can do so responsive to determining the BESS 933 is not discharging energy to the energy grid 945 or charging with energy from the energy grid 945. The controller 923 can transmit control signals to the switching system 929 to be in the second state when the readings from the BESS meter 931 are positive (or within another defined range) and the first state when the readings from the BESS meter 931 are negative, at zero, or below another defined threshold.

In one example, the controller 923 can cause the power flow device or switch 947 to be activated or closed and the power flow device or switch 949 to be inactivated or open in the first state when the BESS meter 931 has a negative reading. The controller 923 can cause the power flow device or switch 949 to be activated or closed and the power flow device or switch 947 to be inactivated or open in the second state when the BESS meter 931 has a positive reading. In some cases, the controller 923 can set the power setpoint of the inverter or other power flow device 953 to be equal (e.g., equal up to a capacity of the inverter or the power flow device 953) to the measurements or readings of the BESS meter 931 or another meter measuring the energy requirements of the BESS devices 935 over time.

In some embodiments, the power flow device or switch 947 can be or include an inverter or other power flow device 947. In such embodiments, the controller 923 can cause the inverter or other power flow device 947 to be active when the switching system 929 is in the first state when the BESS meter 931 has a negative reading and inactive when the BESS meter 931 has a positive value and the switching system 929 is in the second state. In some cases, the controller 923 can set the power setpoint of the inverter or other power flow device 947 to be equal (e.g., equal up to a capacity of the inverter or the power flow device 947) to the measurements or readings of the BESS meter 931 over time. The power flow device or switch 949 can similarly be or include an inverter or other power flow device 949. The controller 923 can control the inverter or other power flow device 949 in the same or a similar manner. Accordingly, the controller 923 can control the switching system 929 to power the BESS devices 935 with energy generated by the RES 951 while restricting energy from flowing from the RES system 927 through the BESS meter 931.

In one example, the controller 923 can control the switching system 929 to enable energy to flow from the RES 951 to power the BESS devices 935 during a defined time period (e.g., during the day). For instance, the standard state of the switching system 929 can be in the second state when the power flow device or switch 947 of the switching system 929 is not active or is open and the power flow device or switch 949 of the switching system 929 is active or closed. The controller 923 can determine that the current time is during the defined time period, such as during the day or between 8 AM and 7 PM. Responsive to the determination, and in some cases responsive to determining the BESS 933 is not discharging energy to the energy grid 945 or charging with energy from the energy grid 945, the controller 923 can adjust the state of the switching system 929 to be in the first state in which the power flow device or switch 947 is active or closed and the power flow device or switch 949 is inactive or open. In some cases, the controller 923 can further control the state of the switching system 929 based on measurements of the BESS meter 931, as described herein. Thus, the RES 951 can provide energy to the BESS devices 935 to reduce no load losses of the BESS devices 935.

The controller 923 can control energy flowing from the RES 951 to the PV devices 941 in a similar manner to how the controller 923 controls energy flowing from the RES 951 to the BESS devices 935. For example, the controller 923 can adjust the state of the switching system 929 from the first state to the second state upon determining the RES 939 are not able to sufficiently power the PV devices 941 (e.g., based on a negative reading of the PV meter 937 or a negative reading of the PV meter 937 for at least a defined time period) or the current time is within a defined time period (e.g., at night or at a time when the sun is not out or is blocked by the clouds), such as a time period in which the RES 939 do not generate energy (e.g., do not generate enough energy or generate an amount of energy below a threshold) to power the PV devices 941. Upon making such a determination, the controller 923 can control or adjust the state of the switching system 929 to be in the second state in which the power flow device or switch 947 is inactive or open and/or the power flow device or switch 949 is active or closed. Such may be advantageous during time periods in which the RES 939 are not able to sufficiently power the PV devices 941 and the RES 951 can assist in powering the PV devices 941. Such may also be advantageous, for example, at night when the RES 951 is a wind generation resource and the RES 939 is a solar generation resource. Accordingly, the controller 923 can enable the RES 951 to operate as a back-up power supply for the PV devices 941.

The controller 923 can control the energy supplied by the RES 951 based on measurements from the PV meter 937. For example, the controller 923 can monitor the readings of the PV meter 937 or the meter 957. Upon determining the PV meter 937 has a reading below zero or a defined threshold (e.g., the energy grid 945 is providing energy through the PV meter 937), the controller 923 can adjust the state of the switching system 929 to cause the switching system 929 to be in the second state to discharge energy from the RES 951 to the PV devices 941. In some cases, the controller 923 can control a power flow device of the switching system 929 to have a power setpoint equal to the PV meter 937 over time to cause the PV meter 937 to have a reading of zero while the BESS 933 powers the PV devices 941. In some cases, the controller 923 can control the power flow device or inverter 953 to have a power setpoint equal to the PV meter 937 over time to cause the PV meter 937 to have a reading of zero while the BESS 933 powers the PV devices 941. In another example, the controller 923 can measure a meter measuring the energy requirements of the PV devices 941 and control the power flow device to have a power setpoint equal to the energy requirements of such a meter.

Accordingly, instead of transferring a BESS (e.g., a T-BESS), a RES resource (e.g., a transferrable RES, or a T-RES or T-PV) can be used to offset "instantaneous" NLL of other co-located plants when the RES resource is producing energy without storing such energy. When not needed to offset NLL losses, the RES can be a part of a legacy PV plant and could be allowed to send energy to the grid along with any legacy RES assets of the legacy PV plant. For instance, a few panels (e.g., a T-RES) of the PV plant can be connected to the transferable bus. During normal operation, the PV switch can be closed and the BESS switch can be open (e.g., the "PV only" state). Accordingly, during normal operation, all energy generated by the T-RES can be sent to the grid and the T-RES can work to imitate the legacy PV system. A legacy plant controller can communicate with a switching system of the T-RES to achieve the imitation. If the BESS is idle and the solar generation from the T-RES is available, and it is feasible (which can all be determined by a controller of the T-RES), the T-RES can be switched to the "BESS only" state and solar energy generated by the T-RES can be used to offset idle BESS losses. The T-RES controller can ensure that the T-RES will not inject more energy than the BESS needs by monitoring the meters and/or communicating with the BESS controller. If there are no regulatory constraints, the T-RES energy can be stored or sent to the grid through the BESS system or the RES system.

Figure 9E:
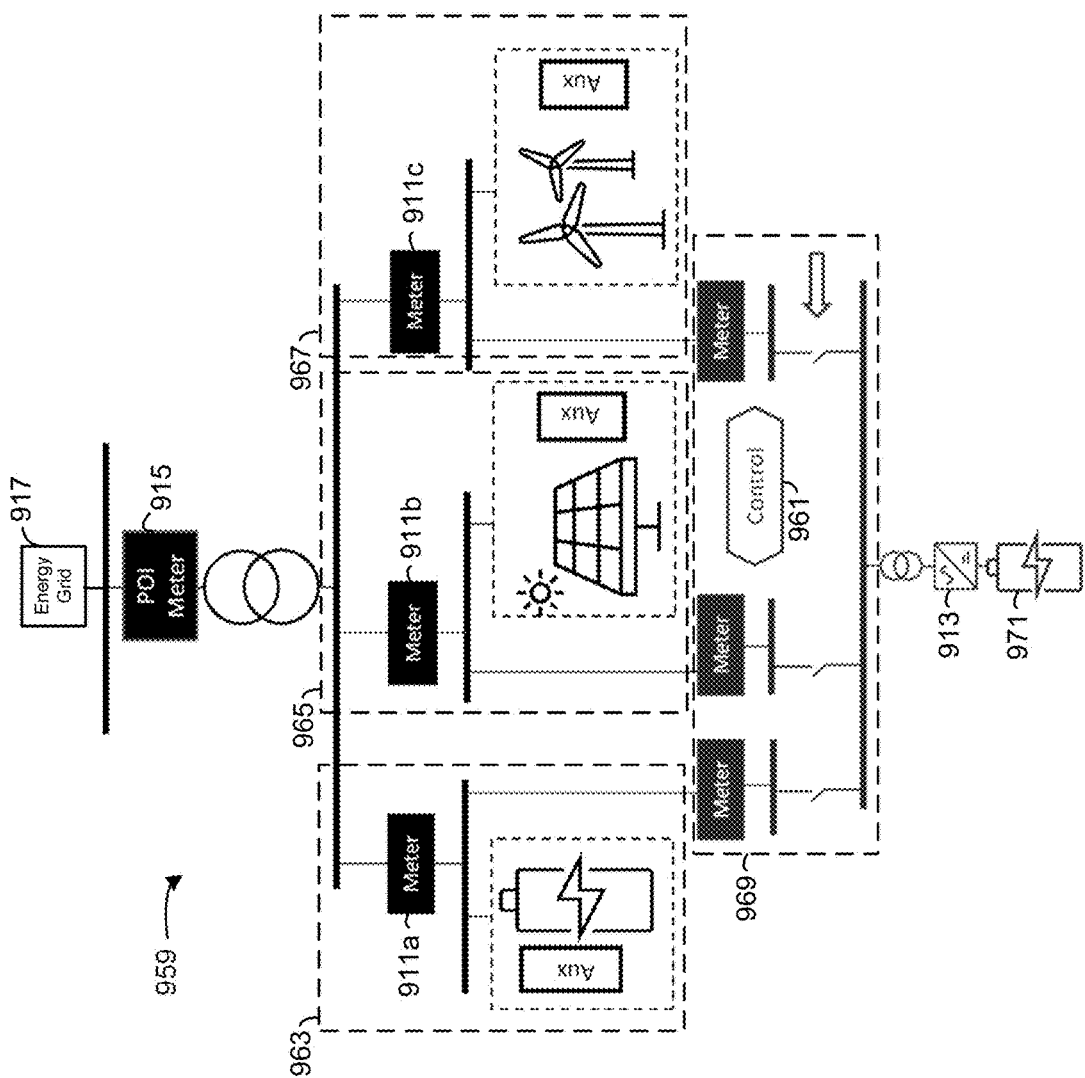
FIG. 9E illustrates an example energy offset management system, according to some embodiments.

FIG. 9E illustrates an example device powering system 959, according to some embodiments. The device powering system 959 may include a controller 961 that communicates with a BESS system 963 of a renewable energy power plant, a first renewable energy source (RES) system 965 of the renewable energy power plant, a second RES system 967 of the renewable energy power plant, a switching system 969 of the renewable energy power plant, and a second BESS 971 of the renewable energy power plant. The second BESS 971 can be or include, in some cases in addition to a BESS, an RES. The BESS system 963 may be the same as or similar to the BESS system 901. The first RES system 965 may be the same as or similar to the RES system 903. The second RES system 967 can be the same as or similar to the first RES system 965 but be or include a different type of RES (e.g., the first RES system 965 can include solar energy sources and the second RES system 967 can include wind energy sources). The system 959 can include any number of similar systems (e.g., any number of systems for different types of renewable energy sources). A POI meter 915 may read how much energy travels to and from an energy grid 917. Components of the device powering system 959 may be similar to or the same as corresponding components of the device powering system 900, shown and described with reference to FIG. 9A, corresponding components of the device powering system 934, shown and described with reference to FIG. 9B, corresponding components of the device powering system 970, shown and described with reference to FIG. 9C, and/or corresponding components of the device powering system 921, shown and described with reference to FIG. 9D.

The switching system 969 can be configured to selectively connect the second BESS 971 with the BESS system 963, the first RES system 965, and/or the second RES system 967. For example, the switching system 969 can include a dedicated switch or power flow device (e.g., an inverter) for each of the systems 963, 965, and/or 967 that can be closed or activated to enable energy to flow from the second BESS 971 to the respective systems 963, 965, and/or 967. The controller 961 can control the switching system 969 such that only one switch or power flow device is closed or activated at a time, thus reducing or eliminating the possibility of intermingling energy between the different systems 963, 965, and 967.

The controller 961 can supply power to the second BESS 913 through the switching system 969. For example, the controller 961 can control the switches or power flow devices of the switching system 969 such that a switch or power flow device between the BESS system 963 and the second BESS 971 is open or inactive and that switches or power flow devices between one or more of the first RES system 965, the second RES systems 967, and any other renewable energy source is closed or active. In some cases, the switching system 969 can include unidirectional power flow devices between the systems 965 and 967 and the second BESS 971 that only allow energy to flow to the second BESS 971. The controller 961 can activate such unidirectional power flow devices to enable energy generated at the systems 965 and 967 to charge the second BESS 971. In doing so, the controller 961 can be configured to allow such charging by a single system at a time or by multiple systems at one time (e.g., to comply with any local regulations).

The controller 961 can monitor meters 911*a*-*c* (individually meter 911, or collectively meters 911) of the respective systems 963, 965, and/or 967 to control the switching system 969. For example, the switching system 969 can operate in different states, each state having a single closed switch or activated power flow device that connects the second BESS 971 with a particular system 963, 965, or 967. The controller 961 can determine when one of the systems 963, 965, or 967 is not sending energy to the energy grid 917 or receiving energy from the energy grid 917, such as based on measurements from the meter 911 of the system 963, 965, or 967 or based on a stored schedule. The controller 961 can monitor, in some cases in response to such a determination, the meter 911 of the system 963, 965, or 967 and determine when the value is in a defined range (e.g., is below zero or negative) that indicates the energy grid 917 is providing energy through the meter into the system 963, 965, or 967. The controller 961 can operate the switch or power flow device corresponding to the system 963, 965, or 967 of the switching system 969 to discharge energy from the second BESS 911 to the devices of the system 963, 965, or 967 to cause the meter 911 of the system 963, 965, or 967 to be zero.

In one example, the controller 961 can discharge the second BESS 971 through an inverter 913. The controller 961 can set the power setpoint of the inverter 913 to be equal to a measurement of the meter 911 over time. The controller 961 can additionally or instead control the switch of the switching system 969 to be closed while the reading of the meter is zero or below, for example. Thus, the controller 961 can power the devices of the system 963, 965, or 967 without intermingling of energy from other systems or sending energy to the energy grid 917 from one system through a meter of another system.

In some embodiments, the controller 961 can use a ranking system to determine which of the systems 963, 965, or 967 to direct energy to from the second BESS 971. For example, the controller 961 can assign and store a ranking for each of the systems 963, 965, and 967 (and any other systems of the renewable energy power plant). The controller 961 can determine more than one of the systems 963, 965, or 967 are not discharging energy to the energy grid 917 or receiving energy from the energy grid 917 and/or do not have the energy to sufficiently power devices of the respective systems 963, 965, or 967. Of the systems 963, 965, or 967 that are not receiving energy from the energy grid 917 or sending energy to the energy grid 917 and/or that are not sufficiently supplying the devices of the respective system 963, 965, or 967 with energy, the controller 961 can identify and compare the assigned rankings. Based on the comparison, the controller 961 can identify the system 963, 965, or 967 with the highest ranking. The controller 961 can activate the power flow device or close the switch connecting the second BESS 971 with the identified system 963, 965, or 967 and power the devices of the system 963, 965, or 967 to bring the meter 911 of the system 963, 965, or 967 to zero, as described herein.

In some embodiments, the controller 961 can use different rules to determine which of the systems 963, 965, or 967 to provide power from the second BESS. For instance, the controller 961 can apply rules to the rankings as described above to direct power to multiple systems at once. One example of such a rule is that the RES systems 965 and 967 can receive power from the second BESS 971 at the same time while the BESS system 963 may not receive power at the same time as any other system. Such a rule may be in place, for example, because a regulation may indicate that RES energy may intermingle within a power plant while BESS energy may not intermingle with RES energy. The controller 961 can store and/or use different rules depending on the location (e.g., the jurisdiction) of the renewable energy power plant in which the controller and the systems 963, 965, and 967 are located to comply with any local regulations of the different locations. The controller 961 may store rules that allow or restrict any combination of systems from receiving energy at the same time. The controller 961 can operate the switching system 969 according to such rules.

Power plants can include multiple generation units of different types (e.g., wind, solar, etc.). A controller can decide when and where to charge a T-BESS (or a T-RES) and, in some cases in which any switching happens through binary switches, ensure that only one switch is closed at a time, as may be required by applicable regulations. With binary switches, the T-BESS can be configured to offset no load losses of any idle plant for co-located assets (e.g., different systems of a renewable energy power plant or separate renewable energy power plants). Switching can also happen, for example using power conversion systems (PCS). When non-binary switches (e.g., PCS) are used, a T-BESS can charge from one or two energy generation resources at the same time or discharge to one, two or all energy generation resources at the same time. The T-BESS can do so, for example, when the energy generation resources are all idle. The system can use controls and meters to avoid exporting energy to the grid as required by any applicable regulations. In some embodiments, a RES can be transferred instead of a BESS to offset instantaneous NLL.

Figure 10:
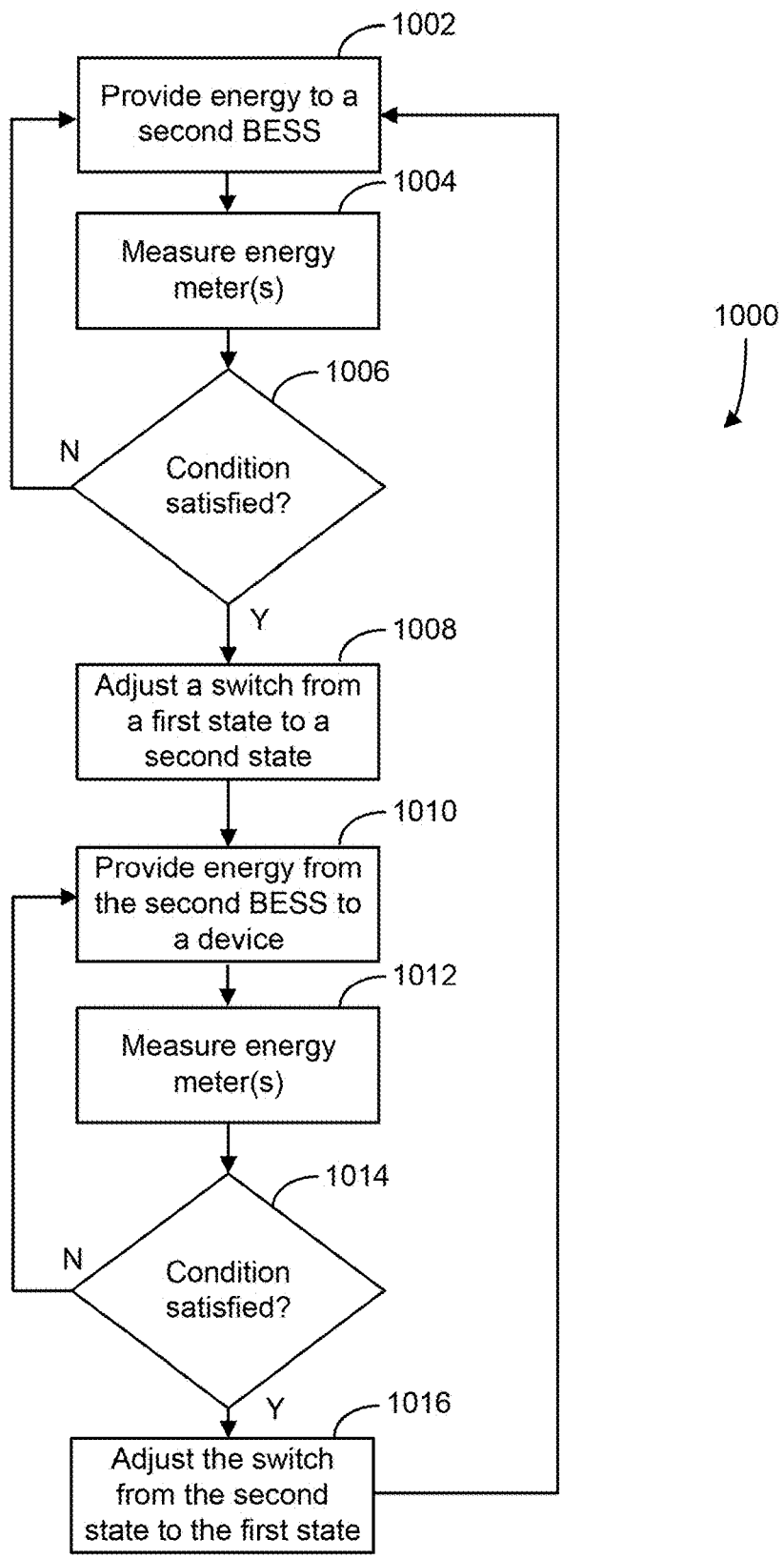
FIG. 10 illustrates a flowchart for powering devices within a renewable energy power plant, according to some embodiments.

FIG. 10 illustrates a method 1000 for powering devices within a renewable energy power plant, according to some embodiments. The method 1000 can be performed by a data processing system (e.g., a controller, the RES –ESS dispatcher unit 36, the ESS controller 22, the RES SCADA controller 12, the computer 1100, the energy offset manager 202, the controller 902, etc.). In some embodiments, the data processing system is the controller of a renewable energy plant coupled to an energy grid and including a BESS. The data processing system may operate to power devices within the renewable energy power plant using energy from a RES and/or another BESS (e.g., T-BESS) charged by the RES. The data processing system may provide sufficient energy to power the devices of the renewable energy facility with renewable energy from the RES and/or the T-BESS without intermingling the renewable energy with other energy from the BESS (e.g., satisfying regulations for renewable energy and other energy being separately stored and transferred to the grid). If the RES does not generate and the T-BESS does not have enough energy stored, the data processing system may direct energy from other RESs of the renewable energy facility to the devices. If the RESs do not have enough energy, the data processing system may retrieve energy from the energy grid to power the devices. In this way, the data processing system may enable RESs to power devices operating within a renewable energy facility via the T-BESS. The devices may be any type of devices that operate within the renewable energy facility, as described above. The method 1000 may include more or fewer operations and the operations may be performed in any order.

At operation 1002, the data processing system directs energy from an RES to a T-BESS. The RES may be configured to generate energy and charge the T-BESS with the generated energy. The RES may be connected to a "renewable energy" side of the renewable energy facility that provides energy to and receives energy from an energy grid through an energy meter that is specific to the renewable energy sources (e.g., a meter that does not measure the energy the energy grid provides to a BESS of the renewable energy facility). In some cases, the data processing system may control the T-BESS separately from any controller that controls other renewable energy sources of the renewable energy facility (e.g., a legacy controller and legacy renewable energy sources). Accordingly, the data processing system in combination with T-BESS may operate as an "add-on" to legacy equipment at the renewable energy facility to ensure the devices operating within the facility are sufficiently powered.

At operation 1004, the data processing system measures one or more energy meters configured to measure energy provided to the energy grid or from the energy grid. The energy meters may include an energy meter coupled between the energy grid and the devices. For example, the devices may have an energy requirement to operate. If the BESS is consuming energy to fulfill the energy requirement, the energy meter will measure a first value (e.g., a negative value) within a defined range of values. At 1006, the data processing system determines whether a condition is satisfied. For example, the condition may be if the measurement (the first value) is within the defined range, is within the defined range for a defined period of time, if the BESS is neither providing energy to the energy grid nor receiving energy from the energy grid, and/or a current time is within a time period of a stored schedule that indicates the BESS will neither provide energy to the energy grid nor receive energy from the energy grid. If the data processing system determines the condition is not satisfied, the data processing system goes back to operation 1002.

At operation 1008, the data processing system adjusts a state of a switch configured to selectively couple the T-BESS with the RES (in a first state) or the BESS and the devices (in a second state). Responsive to determining the condition is satisfied, the data processing system adjusts the state of the switch from the first state to the second state to couple the T-BESS with the first BESS and the devices. In some cases, the RES charges the T-BESS when the switch is in the first state, and the T-BESS provides energy to (e.g., discharges to) the devices when the switch is in the second state. As described herein any adjusting of the state of a switch can refer to an adjustment to the state of a switching system, such as the switching systems 960 or 996.

At operation 1010, the data processing system provides energy from the T-BESS to the devices. In some cases, the data processing system sends a message to the T-BESS to discharge energy (to the BESS) responsive to adjusting the state of the switch to the second state. In some cases, the data processing system sends the message responsive to a schedule, stored in memory, indicating when to provide energy. In some embodiments, the T-BESS automatically discharges energy responsive to the data processing system adjusting the state of the switch. At operation 1012, the data processing system measures the energy meters while the switch is in the second state (e.g., coupled with the BESS and the devices). The data processing system measures a second energy meter coupled between the energy meters and the T-BESS, the second energy meter configured to measure energy provided to and from the BESS, the devices, and the T-BESS.

At operation 1014, the data processing system determines whether a second condition has been satisfied. The second condition including at least one of determining a measurement from the energy meters is within a defined range, a measurement from the second energy meter is within a defined range, an energy level of the T-BESS is within a defined range, a current time is within a defined time period, a current time matches a time period of a schedule indicating to adjust the state of the switch, or another condition. In some cases, the defined ranges may be all values (e.g., integers) below a zero value, above a zero value, at a zero value, or any combination thereof. If the data processing system determines the second condition is not satisfied, the data processing system commands the T-BESS to provide an amount of energy to the devices, at operation 1010, the amount of energy sufficient to maintain a measurement of the energy meters (e.g., maintain the measurement at a zero value, which can off-set the BESS energy losses). At operation 1016, responsive to determining that the second condition is satisfied, the data processing system adjusts the state of the switch from the second state to the first state and begins providing energy to the T-BESS at operation 1002.

Advantageously, by connecting a T-BESS and/or controller between devices operating within a renewable energy facility and RES s already connected to the facility, the data processing system may power the devices without relying on any energy from the BESS that is within the facility and is susceptible to parasitic losses. Instead, the T-BESS and the controller may operate as a self-containing energy source that can power the devices alone or communicate with legacy equipment and/or, if necessary, the energy grid to provide energy to the devices. This configuration may enable the devices to be sufficiently powered using renewable energy as the main source of energy and energy from the energy grid only in certain situations. Accordingly, less energy may be required from the energy grid, enabling the grid to provide energy to other loads, thus reducing the peak load requirements of the energy grid and increasing the availability of energy on the grid.

In some cases, a controller controlling a switching system connected to a T-BESS or T-RES to avoid sending energy to an energy grid may be configured or reconfigured to allow the T-BESS or T-RES to send energy to the energy grid. Such may be advantageous, for example, when regulations change that may allow intermingling of energy. In one example, the configuration of the controller may cause the controller to stop monitoring or to otherwise not monitor a meter measuring energy flow to the energy grid or from the energy grid. In another example, the configuration may allow the T-BESS or T-RES to continue discharging to the energy grid despite any readings on such a meter that indicate the T-BESS or T-RES is providing energy to the energy grid.

In at least one aspect, a system comprises a renewable energy power plant coupled to an energy grid, the renewable energy power plant comprising a first battery energy storage system (BESS), a second BESS, and one or more renewable energy sources (RES); a device operating within the renewable energy power plant, the device receiving energy from at least the second BESS to satisfy energy requirements; a switch configured to selectively couple the second BESS with (1) the one or more RES in a first state, or (2) the first BESS and the device in a second state, where the one or more RES charge the second BESS when the switch is in the first state, and the second BESS provides energy to the device when the switch is in the second state; and one or more processors configured to determine a condition is satisfied; and responsive to determining the condition is satisfied, adjust a state of the switch from the first state to the second state to couple the second BESS with the first BESS and the device. In some embodiments, the one or more processors of the system are configured to determine the condition is satisfied responsive to determining the first BESS is not providing energy to the energy grid nor receiving energy from the energy grid.

In some embodiments, the one or more processors of the system are configured to determine the condition is satisfied by determining a current time is within a time period of a stored schedule that indicates the first BESS will not provide energy to the energy grid nor receive energy from the energy grid. In some embodiments, the system further comprises an energy meter coupled between the device and the energy grid and configured to measure energy provided to the energy grid or from the energy grid, and wherein the one or more processors are configured to determine the condition is satisfied by measuring the energy meter; and determining the condition is satisfied responsive to determining a measurement of the energy meter is within a defined range and responsive to the determining the first BESS is not providing energy to the energy grid or receiving energy from the energy grid. In some embodiments, the one or more processors of the system are configured to determine the condition is satisfied responsive to determining the measurement is within the defined range for a defined time period.

In some embodiments, the one or more processors of the system are configured to send a message to the second BESS to discharge energy responsive to adjusting the state of the switch to the second state. In some embodiments, the system further comprises an energy meter coupled between the device and the energy grid and configured to measure energy provided to the energy grid or received from the energy grid, and wherein the one or more processors are configured to measure the energy meter while the switch is in the second state; and adjust the state of the switch from the second state to the first state responsive to determining a measurement from the energy meter is within a defined range. In some embodiments of the system, the defined range is above a value of zero. In some embodiments, the system further comprises a first energy meter coupled between the device and the energy grid and configured to measure energy provided to the energy grid or received from the energy grid;

and a second energy meter coupled between the first energy meter and the second BESS, where the one or more processors are configured to measure the second energy meter; and adjust the state of the switch from the second state to the first state responsive to determining a measurement from the second energy meter is within a defined range. In some embodiments of the system, the defined range is below a zero value. In some embodiments, the system includes an energy meter configured to measure energy flow to the device, wherein the one or more processors are configured to: measure the energy meter; and adjust the state of the switch from the second state to the first state responsive to determining a measurement from the second energy meter is within a defined range.

In some embodiments, the system further comprises an energy meter coupled between the device and the energy grid and configured to measure energy provided to the energy grid or received from the energy grid, and wherein the one or more processors are configured to measure the energy meter while the switch is in the second state; and command the second BESS to provide energy to the device to maintain a measurement of the energy meter at a zero value. In some embodiments of the system, the device is a heating ventilation and air conditioning (HVAC) device. In some embodiments of the system, the first BESS is configured within the renewable energy power plant such that the first BESS does not receive or send any energy from or to the one or more RES.

In one aspect, a method comprises determining, by one or more processors of a renewable energy power plant coupled to an energy grid, a condition is satisfied, wherein the renewable energy power plant comprises a first battery energy storage system (BESS), a second BESS, and one or more renewable energy sources (RES s); and responsive to determining the condition is satisfied, adjusting, by the one or more processors, a state of a switch from a first state configured to couple the second BESS with the one or more RES to a second state configured to couple the second BESS with the first BESS and a device operating within the renewable energy power plant, the device receiving energy from at least the second BESS to satisfy energy requirements, wherein the one or more RES charge the second BESS when the switch is in the first state, and the second BESS provides energy to the device when the switch is in the second state.

In some embodiments, the method further comprises determining the condition is satisfied further comprises determining, by the one or more processors, the first BESS is not providing energy to the energy grid nor receiving energy from the energy grid. In some embodiments, the method further comprises sending, by the one or more processors, a message to the second BESS to discharge energy responsive to adjusting the state of the switch to the second state. In some embodiments, the method further comprises measuring, by the one or more processors, an energy meter while the switch is in the second state, the energy meter coupled between the device and the energy grid and configured to measure energy provided to the energy grid or from the energy grid; and commanding, by the one or more processors, the second BESS to provide energy to the device to maintain a measurement of the energy meter at a zero value.

In some embodiments, a system comprises a first battery energy storage system (BESS); a switch configured to selectively couple the first BESS with (1) in a first state, one or more renewable energy sources (RES) of a renewable energy power plant coupled to an energy grid, or (2) in a second state, a second BESS and a device of the renewable energy power plant, where the one or more RES charge the first BESS when the switch is in the first state, and the first BESS provides energy to the device when the switch is in the second state; and one or more processors configured to determine a condition is satisfied; and responsive to determining the condition is satisfied, adjust a state of the switch from the first state to the second state to couple the first BESS with the second BESS and the device. In some embodiments of the system, the one or more processors are configured to determine the condition is satisfied responsive to determining the second BESS is not providing energy to the energy grid nor receiving energy from the energy grid. In some embodiments of the system, the one or more processors are configured to command the first BESS to discharge energy to the device responsive to adjusting the state of the switch from the first state to the second state.

In at least one aspect, the present disclosure describes a system. The system can include a renewable energy power plant coupled to an energy grid, the renewable energy power plant comprising a first battery energy storage system (BESS), a second BESS, and one or more renewable energy sources (RES); a device operating within the renewable energy power plant, the device receiving energy from at least the second BESS to satisfy energy requirements; a switching system configured to selectively couple the second BESS with (1) the one or more RES in a first state, or (2) the first BESS and the device in a second state, wherein the one or more RES charge the second BESS when the switching system is in the first state, and the second BESS provides energy to the device when the switching system is in the second state; and one or more processors configured to determine a condition is satisfied; and responsive to determining the condition is satisfied, adjust a state of the switching system from the first state to the second state to couple the second BESS with the first BESS and the device.

In some embodiments, the one or more processors are configured to determine the condition is satisfied responsive to determining the first BESS is not providing energy to the energy grid nor receiving energy from the energy grid. In some embodiments, the one or more processors are configured to determine the condition is satisfied by determining a current time is within a time period of a stored schedule that indicates the first BESS will not provide energy to the energy grid nor receive energy from the energy grid.

In some embodiments, the system further includes an energy meter coupled between the device and the energy grid and configured to measure energy provided to the energy grid or from the energy grid, and wherein the one or more processors are configured to determine the condition is satisfied by measuring the energy meter; and determining the condition is satisfied responsive to determining a measurement of the energy meter is within a defined range and responsive to the determining the first BESS is not providing energy to the energy grid or receiving energy from the energy grid. In some embodiments, the one or more processors are configured to determine the condition is satisfied responsive to determining the measurement is within the defined range for a defined time period.

In some embodiments, the switch switching system comprises a switch configured to selectively couple the second BESS with the one or more RES in the first state and the second BESS with the device and the first BESS in the second state. In some embodiments, the switching system comprises a first switch configured to selectively couple the second BESS with the one or more RES when the switching system is in the first state; and a second switch configured to selectively couple the second BESS with the first BESS and the device when the switching system is in the second state, wherein the first switch is configured not to couple the second BESS with the one or more RES when the switching system is in the second state and the second switch is configured not to couple the second BESS with the device and the first BESS when the switching system is in the first state.

In some embodiments, the one or more processors are configured to adjust the state of the switching system from the first state to the second state by disconnecting, through the first switch, the second BESS from the one or more RES; and connecting, through the second switch, the second BESS with the first BESS and the device. In some embodiments, the switching system comprises a first inverter configured to selectively activate to couple the second BESS with the one or more RES when the switching system is in the first state; and a second inverter configured to selectively activate to couple the second BESS with the first BESS and the device when the switching system is in the second state, wherein the first inverter is configured not to couple the second BESS with the one or more RES when the switching system is in the second state and the first inverter is deactivated and the second inverter is configured not to couple the first BESS with the device and the first BESS when the switching system is in the first state and the second inverter is deactivated. In some embodiments, the one or more processors are configured to adjust the state of the switching system from the first state to the second state by deactivating the first inverter to decouple the second BESS from the one or more RES; and activating the second inverter to couple the second BESS with the device and the first BESS.

In some embodiments, the switch switching system comprises a switch configured to selectively couple the second BESS with the one or more RES in the first state and the second BESS with the device and the first BESS in the second state. In some embodiments, the switching system comprises a first switch configured to selectively couple the second BESS with the one or more RES when the switching system is in the first state; and a second switch configured to selectively couple the second BESS with the first BESS and the device when the switching system is in the second state, wherein the first switch is configured not to couple the second BESS with the one or more RES when the switching system is in the second state and the second switch is configured not to couple the second BESS with the device and the first BESS when the switching system is in the first state.

In some embodiments, the one or more processors are configured to adjust the state of the switching system from the first state to the second state by disconnecting, through the first switch, the second BESS from the one or more RES; and connecting, through the second switch, the second BESS with the first BESS and the device. In some embodiments, the switching system comprises a first power flow device configured to selectively activate to couple the second BESS with the one or more RES when the switching system is in the first state; and a second power flow device configured to selectively activate to couple the second BESS with the first BESS and the device when the switching system is in the second state, wherein the first power flow device is configured not to couple the second BESS with the one or more RES when the switching system is in the second state and the first power flow device is deactivated and the second power flow device is configured not to couple the first BESS with the device and the first BESS when the switching system is in the first state and the second power flow device is deactivated.

In some embodiments, the one or more processors are configured to adjust the state of the switching system from the first state to the second state by deactivating the first power flow device to decouple the second BESS from the one or more RES; and activating the second power flow device to couple the second BESS with the device and the first BESS. In some embodiments, the first power flow device is a first inverter, and the second power flow device is a second inverter.

Computing Environment

Having discussed specific embodiments of the present solution, it may be helpful to describe aspects of the operating environment as well as associated system components (e.g., hardware elements) in connection with the methods and systems described herein.

Figure 11A:
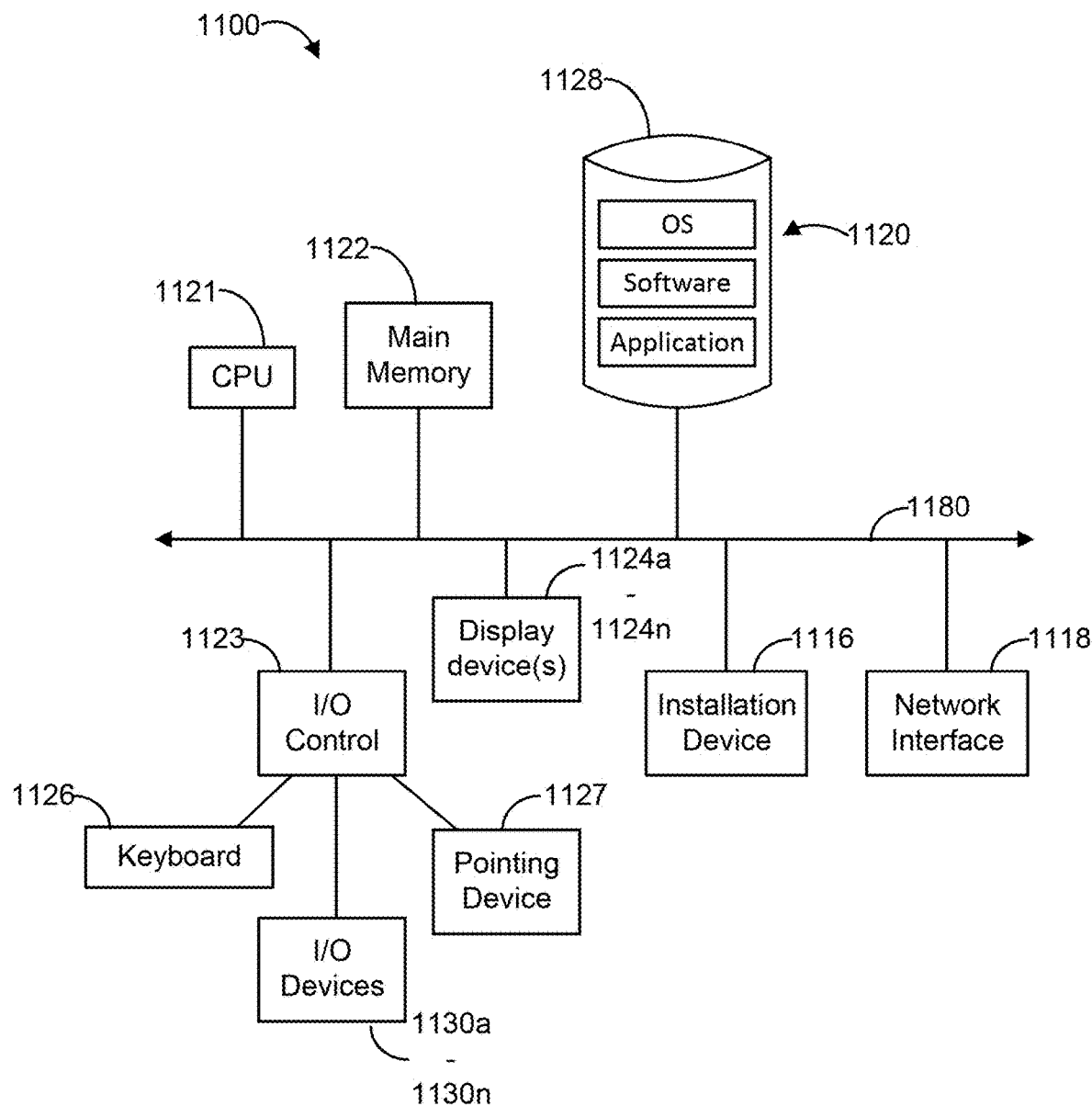
FIGS. 11A and 11B are block diagrams depicting embodiments of computing devices useful in connection with the methods and systems described herein.
Figure 11B:
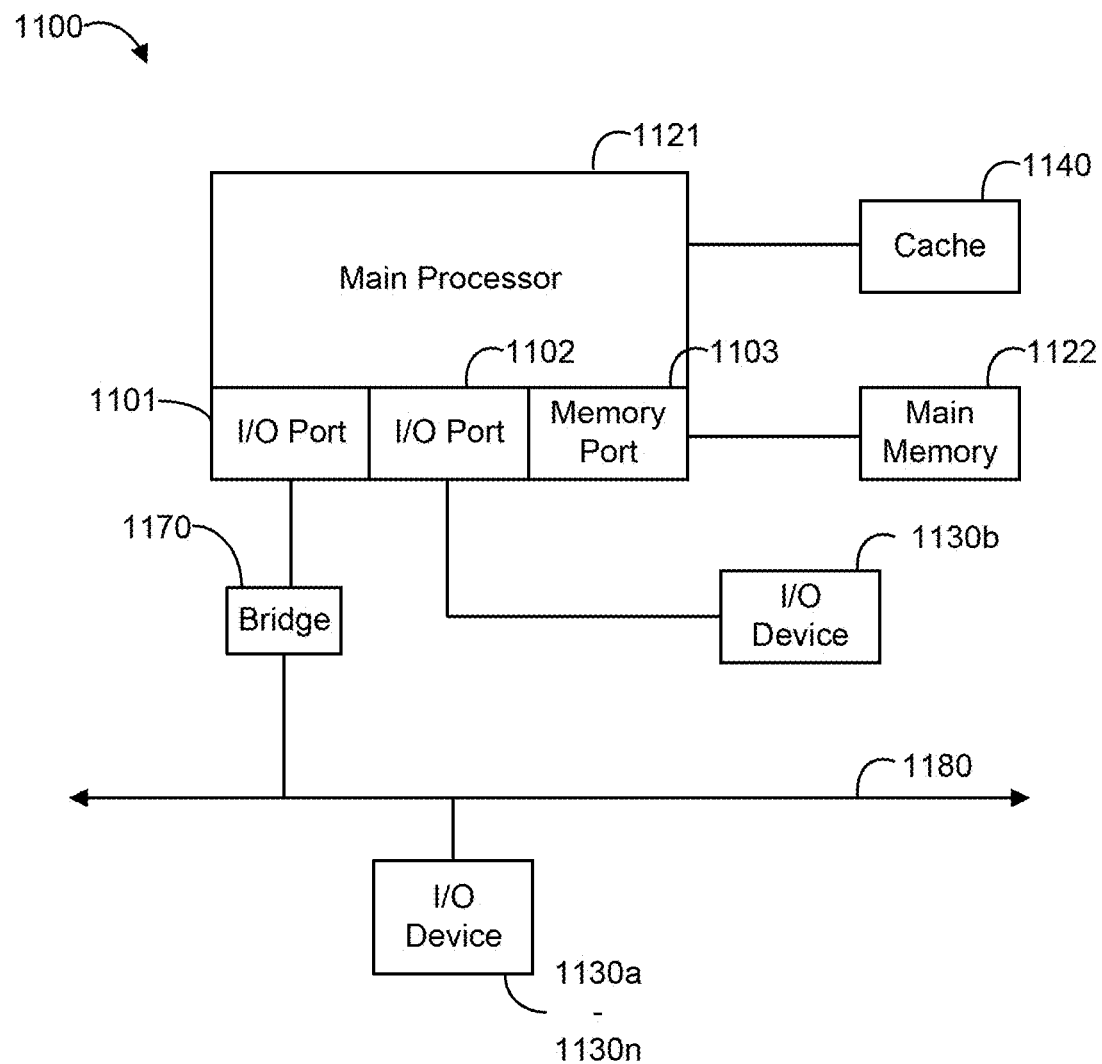

The systems discussed herein may be deployed as and/or executed on any type and form of computing device, such as a computer, network device or appliance capable of communicating on any type and form of network and performing the operations described herein. FIGS. 11A and 11B depict block diagrams of a computing device 1100 useful for practicing an embodiment of the systems and methods described herein. As shown in FIGS. 11A and 11B, each computing device 1100 includes a central processing unit 1121, and a main memory unit 1122. As shown in FIG. 11A, a computing device 1100 may include a storage device 1128, an installation device 1116, a network interface 1118, an I/O controller 1123, display devices 1124a-1124n, a keyboard 1126 and a pointing device 1127, such as a mouse. The storage device 1128 may include, without limitation, an operating system and/or software. As shown in FIG. 11B, each computing device 1100 may also include additional optional elements, such as a memory port 1103, a bridge 1170, one or more input/output devices 1130a-1130n (generally referred to using reference numeral 1130), and a cache memory 1140 in communication with the central processing unit 1121.

The central processing unit 1121 is any logic circuitry that responds to and processes instructions fetched from the main memory unit 1122. In many embodiments, the central processing unit 1121 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 1100 may be based on any of these processors, or any other processor capable of operating as described herein.

The main memory unit 1122 may be one or more memory chips capable of storing data and allowing any storage location to be directly accessed by the central processing unit 1121, such as any type or variant of Static random access memory (SRAM), Dynamic random access memory (DRAM), Ferroelectric RAM (FRAM), NAND Flash, NOR Flash and Solid State Drives (SSD). The main memory unit 1122 may be based on any of the above described memory chips, or any other available memory chips capable of operating as described herein. In the embodiment shown in FIG. 11A, the central processing unit 1121 communicates with main memory unit 1122 via a system bus 1180 (described in more detail below). FIG. 11B depicts an embodiment of a computing device 1100 in which the processor communicates directly with the main memory unit 1122 via a memory port 1103. For example, in FIG. 11B the main memory unit 1122 may be DRDRAM.

FIG. 11B depicts an embodiment in which the central processing unit 1121 communicates directly with cache memory 1140 via a secondary bus, sometimes referred to as a backside bus. In other embodiments, the central processing unit 1121 communicates with cache memory 1140 using the system bus 1180. Cache memory 1140 typically has a faster response time than main memory unit 1122 and is provided by, for example, SRAM, BSRAM, or EDRAM. In the embodiment shown in FIG. 11B, the central processing unit 1121 communicates with various I/O devices 1130 via a local system bus 1180. Various buses may be used to connect the central processing unit 1121 to any of the I/O devices 1130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1124, the central processing unit 1121 may use an Advanced Graphics Port (AGP) to communicate with the display 1124. FIG. 11B depicts an embodiment of a computer 1100 in which the central processing unit 1121 may communicate directly with I/O device 1130*b*, for example via HYPERTRANSPORT, RAPIDIO, or INFINIBAND communications technology. FIG. 11B also depicts an embodiment in which local busses and direct communication are mixed: the central processing unit 1121 communicates with I/O device 1130*a* using a local interconnect bus while communicating with I/O device 1130*b* directly.

A wide variety of I/O devices 1130*a*-1130*n* may be present in the computing device 1100. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 1123 as shown in FIG. 11A. The I/O controller may control one or more I/O devices such as a keyboard 1126 and a pointing device 1127, e.g., a mouse or optical pen. Furthermore, an I/O device may also provide storage and/or an installation device 1116 for the computing device 1100. In still other embodiments, the computing device 1100 may provide USB connections (not shown) to receive handheld USB storage devices such as the USB Flash Drive line of devices manufactured by Twintech Industry, Inc., of Los Alamitos, California.

Referring again to FIG. 11A, the computing device 1100 may support any suitable installation device 1116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1100 may further include a storage device, such as one or more hard disk drives or redundant arrays of independent disks, for storing an operating system and other related software, and for storing application software programs such as any program or software 1120 for implementing (e.g., configured and/or designed for) the systems and methods described herein. Optionally, any of the installation devices 1116 could also be used as the storage device. Additionally, the operating system and the software can be run from a bootable medium.

Furthermore, the computing device 1100 may include a network interface 1118 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1100 communicates with other computing devices 1100' via any type and/or form of gateway or tunneling protocol such as Secure Socket Layer (SSL) or Transport Layer Security (TLS). The network interface 1118 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

In some implementations, the computing device 1100 may include or be connected to one or more display devices 1124*a*-1124*n*. As such, any of the I/O devices 1130*a*-1130*n* and/or the I/O controller 1123 may include any type and/or form of suitable hardware, software, or combination of hardware and software to support, enable or provide for the connection and use of the display device(s) 1124*a*-1124*n* by the computing device 1100. For example, the computing device 1100 may include any type and/or form of video adapter, video card, driver, and/or library to interface, communicate, connect or otherwise use the display device(s) 1124*a*-1124*n*. In one embodiment, a video adapter may include multiple connectors to interface to the display device(s) 1124*a*-1124*n*. In other embodiments, the computing device 1100 may include multiple video adapters, with each video adapter connected to the display device(s) 1124*a*-1124*n*. In some implementations, any portion of the operating system of the computing device 1100 may be configured for using multiple displays 1124*a*-1124*n*. One ordinarily skilled in the art will recognize and appreciate the various ways and embodiments that a computing device 1100 may be configured to have one or more display devices 1124*a*-1124*n*.

In further embodiments, an I/O device 1130 may be a bridge between the system bus 1180 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1100 of the sort depicted in FIGS. 11A and 11B may operate under the control of an operating system, which control scheduling of tasks and access to system resources. The computing device 1100 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 1100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1100 has sufficient processor power and memory capacity to perform the operations described herein.

In some implementations, the computing device 1100 may have different processors, operating systems, and input devices consistent with the device. For example, in one embodiment, the computing device 1100 is a smart phone, mobile device, tablet or personal digital assistant. In still other embodiments, the computing device 1100 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 1100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
a renewable energy power plant coupled to an energy grid, the renewable energy power plant comprising a battery energy storage system (BESS);

a device operating within the renewable energy power plant, the device having energy requirements and receiving energy from the BESS;

an energy offset system;

a processor, the processor operatively coupled to computer memory and configured by machine-readable instructions to:

determine the BESS is not charging with energy from the energy grid and is not discharging energy to the energy grid; and responsive to (i) the determination that the BESS is not charging with energy from the energy grid and is not discharging energy to the energy grid, and (ii) determining the energy requirements of the device are currently not satisfied:

identify an amount of energy that is needed to satisfy the energy requirements of the device in combination with energy provided by the BESS to the device; and direct the identified amount of energy from the energy offset system to the device by changing a state of a switch directing energy from the energy offset system to the device;

establish a connection with a second processor controlling the BESS;

receive a state of charge of the BESS or a request for energy from the second processor; and direct energy from the energy offset system to the BESS based on the received state of charge or the request for energy from the second processor.

2. The system of claim 1, wherein the processor is configured to determine the BESS is not charging with energy from the energy grid or discharging energy to the energy grid by determining the BESS is not charging with energy from the energy grid or discharging energy to the energy grid based on a charge/discharge schedule for the BESS.

3. The system of claim 1, further comprising:

a load energy meter measuring energy provided to and received from the energy grid, wherein the load energy meter is coupled in series between the device and the energy grid.

4. A system, comprising:

a renewable energy power plant coupled to an energy grid, the renewable energy power plant comprising a battery energy storage system (BESS);

a device operating within the renewable energy power plant, the device having energy requirements and receiving energy from the BESS;

an energy offset system;

a processor, the processor operatively coupled to computer memory and configured by machine-readable instructions to:

determine the BESS is not charging with energy from the energy grid and is not discharging energy to the energy grid; and responsive to (i) the determination that the BESS is not charging with energy from the energy grid and is not discharging energy to the energy grid, and (ii) determining the energy requirements of the device are currently not satisfied:

identify an amount of energy that is needed to satisfy the energy requirements of the device in combination with energy provided by the BESS to the device; and direct the identified amount of energy from the energy offset system to the device by changing a state of a switch directing energy from the energy offset system to the device;

wherein the processor is further configured to:

charge a second BESS with energy generated by the energy offset system during a first time period;

determine the BESS is not providing enough energy to satisfy the energy requirements of the device during a second time period subsequent to the first time period;

calculate a second amount of energy that is needed to satisfy the energy requirements of the device in combination with energy provided by the BESS; and discharge the calculated second amount of energy from the second BESS to the device during the second time period.

5. The system of claim 4, wherein the processor is configured to determine the BESS is not providing enough energy to satisfy the energy requirements of the device by determining the BESS in combination with the energy offset system is not providing enough energy to satisfy the energy requirements of the device during the second time period; and wherein the processor is configured to calculate the second amount of energy by calculating the second amount of energy that is needed to satisfy the energy requirements of the device in combination with energy provided by the BESS and the energy offset system.

6. A method, comprising:

determining, by a processor, a battery energy storage system (BESS) of a renewable energy power plant is not charging with energy from an energy grid or discharging energy to the energy grid;

responsive to (i) the determining the BESS is not charging with energy from the energy grid and is not discharging energy to the energy grid, and (ii) determining the energy requirements of a device operating in the renewable energy power plant are currently not satisfied:

identifying, by the processor, an amount of energy that is needed to satisfy the energy requirements of the device operating in the renewable energy power plant in combination with energy provided by the BESS to the device; and directing, by the processor, the identified amount of energy from an energy offset system to the device by changing a state of a switch directing energy from the energy offset system to the device;

establishing, by the processor, a connection with a second processor controlling the BESS;

receiving, by the processor, a state of charge of the BESS or a request for energy from the second processor; and directing, by the processor, energy from the energy offset system to the BESS based on the received state of charge or the request for energy from the second processor.

7. The method of claim 6, wherein determining the BESS is not charging with energy from the energy or discharging energy to the energy grid comprises determining, by the processor, the BESS is not charging with energy from the energy grid or discharging energy to the energy grid based on a charge/discharge schedule for the BESS.

8. The method of claim 6, further comprising:

charging, by the processor, a second BESS with energy generated by the energy offset system during a first time period;

determining, by the processor, the BESS is not providing enough energy to satisfy the energy requirements of the device during a second time period subsequent to the first time period;

calculating, by the processor, a second amount of energy that is needed to satisfy the energy requirements of the device in combination with energy provided by the BESS to the device; and discharging, by the processor, the calculated second amount of energy from the second BESS to the device during the second time period.

9. The method of claim 8, wherein determining the BESS is not providing enough energy to satisfy the energy requirements of the device comprises determining, by the processor, the BESS is not providing enough energy to satisfy the energy requirements of the device during the second time period; and wherein calculating the second amount of energy comprises calculating, by the processor, the second amount of energy that is needed to satisfy the energy requirements of the device in combination with energy provided by the BESS.

10. The method of claim 9, further comprising:

determining, by the processor, the second time period is a time period in which the energy offset system does not generate energy;

wherein discharging the calculated second amount of energy from the second BESS comprises discharging, by the processor, the calculated second amount of energy from the second BESS in response to determining the second time period is a time period in which the energy offset system does not generate energy.

11. The method of claim 6, further comprising: measuring, by the processor, a load energy meter coupled in series between the device and the energy grid.

12. The method of claim 6, wherein identifying the amount of energy that is needed to satisfy the energy requirements of the device in combination with energy provided by the BESS is performed at a first time, and further comprising:

identifying, by the processor at a second time subsequent to the first time, a second amount of energy that is needed to satisfy the energy requirements of the device in combination with energy provided by the BESS, the second amount of energy higher than the amount of energy and resulting from parasitic losses of a transformer of the BESS in an idle state; and directing, by the processor, the identified second amount of energy from the energy offset system to the device.

13. The method of claim 6, wherein directing the identified amount of energy from the energy offset system to the device comprises directing, by the processor, the identified amount of energy from the energy offset system to the device without transferring any energy to the BESS from the energy offset system.

14. The method of claim 6, wherein the device is a heating ventilation and air conditioning (HVAC) device.

15. The method of claim 6, further comprising:

charging a second BESS with energy generated by the energy offset system during a first time period;

determining the BESS is not providing enough energy to satisfy the energy requirements of the device during a second time period subsequent to the first time period; and during the second time period:

discharging, by the processor, energy from the second BESS to the device during the second time period; and increasing, by the processor, the energy being discharged from the second BESS to the device until measuring a value from a load energy meter equal to zero or a defined threshold, the load energy meter measuring energy provided to and received from the energy grid.

16. A non-transitory computer-readable media comprising computer-executable instructions embodied thereon that, when executed by a processor, cause the processor to perform a process comprising:

determine the BESS is not charging with energy from the energy grid and is not discharging energy to the energy grid;

responsive to (i) the determination that the BESS is not charging with energy from the energy grid and is not discharging energy to the energy grid, and (ii) determining the energy requirements of the device are currently not satisfied:

identify an amount of energy that is needed to satisfy the energy requirements of the device in combination with energy provided by the BESS to the device; and direct the identified amount of energy from the energy offset system to the device by changing a state of a switch directing energy from the energy offset system to the device;

establish a connection with a second processor controlling the BESS;

receive a state of charge of the BESS or a request for energy from the second processor; and direct energy from the energy offset system to the BESS based on the received state of charge or the request for energy from the second processor.

17. The non-transitory computer-readable media of claim 16, wherein the processor is configured to determine the BESS is not charging with energy from the energy grid or discharging energy to the energy grid by determining the BESS is not charging with energy from the energy grid or discharging energy to the energy grid based on a charge/discharge schedule for the BESS.

18. The non-transitory computer-readable media of claim 16, wherein the processor is further configured to:

charge a second BESS with energy generated by the energy offset system during a first time period;

determine the BESS is not providing enough energy to satisfy the energy requirements of the device during a second time period subsequent to the first time period;

calculate a second amount of energy that is needed to satisfy the energy requirements of the device in combination with energy provided by the BESS; and discharge the calculated second amount of energy from the second BESS to the device during the second time period.

19. The non-transitory computer-readable media of claim 18, wherein the processor is configured to determine the BESS is not providing enough energy to satisfy the energy requirements of the device by determining the BESS in combination with the energy offset system is not providing enough energy to satisfy the energy requirements of the device during the second time period; and wherein the processor is configured to calculate the second amount of energy by calculating the second amount of energy that is needed to satisfy the energy requirements of the device in combination with energy provided by the BESS and the energy offset system.

* * * * *